(12) United States Patent
Salame

(10) Patent No.: US 11,361,000 B2
(45) Date of Patent: Jun. 14, 2022

(54) PREDICTIVE AND ADAPTIVE QUEUE FLUSHING FOR REAL-TIME DATA RECONCILIATION BETWEEN LOCAL AND REMOTE DATABASES

(71) Applicant: TalkCycle LLC, San Mateo, CA (US)

(72) Inventor: Mansour Salame, Atherton, CA (US)

(73) Assignee: TALKCYCLE LLC, San Mateo, CA (US)

( * ) Notice: Subject to any disclaimer, the term of this patent is extended or adjusted under 35 U.S.C. 154(b) by 461 days.

(21) Appl. No.: 15/243,960

(22) Filed: Aug. 22, 2016

(65) Prior Publication Data

US 2017/0235808 A1 Aug. 17, 2017

Related U.S. Application Data

(63) Continuation-in-part of application No. 14/924,688, filed on Oct. 27, 2015, now Pat. No. 10,911,536.

(51) Int. Cl.
| | |
|---|---|
| *G06F 16/27* | (2019.01) |
| *H04L 67/56* | (2022.01) |
| *H04L 67/1095* | (2022.01) |
| *H04L 67/50* | (2022.01) |
| *H04L 67/565* | (2022.01) |
| *H04L 69/40* | (2022.01) |
| *H04L 67/10* | (2022.01) |

(52) U.S. Cl.
CPC .......... *G06F 16/275* (2019.01); *G06F 16/273* (2019.01); *H04L 67/10* (2013.01); *H04L 67/1095* (2013.01); *H04L 67/22* (2013.01); *H04L 67/28* (2013.01); *H04L 67/2823* (2013.01); *H04L 69/40* (2013.01)

(58) Field of Classification Search
CPC ............ G06F 17/30581; G06F 16/275; G06F 16/273; H04L 67/10; H04L 67/1095; H04L 67/22; H04L 67/28; H04L 67/2823; H04L 69/40
USPC ........................................................ 707/809
See application file for complete search history.

(56) References Cited

U.S. PATENT DOCUMENTS

| | | | |
|---|---|---|---|
| 8,671,074 B2 * | 3/2014 | Wang .................. | G06F 11/2097 707/634 |
| 8,738,706 B1 * | 5/2014 | Grieve ................. | G06Q 10/101 709/219 |
| 9,218,102 B1 * | 12/2015 | Greenspan ............ | G06F 40/197 |

(Continued)

FOREIGN PATENT DOCUMENTS

GB 2420882 A * 6/2006 ....... G06F 17/30578

*Primary Examiner* — Hosain Talam
*Assistant Examiner* — Robert F May
(74) *Attorney, Agent, or Firm* — Galvin Patent Law LLC; Brian R. Galvin; Brian S. Boon

(57) ABSTRACT

Predictive queue flushing for real-time synchronization of data sets between two data stores, comprising a data synchronization software module that interfaces with each data store, and uses a queue monitor to record and store changes to data on each data store and calculate velocity and acceleration of event arrivals, and a policy manager to manage synchronization, and a query generator to incorporate policies from the policy manager and measurements from the queue monitor to direct the data synchronization software module, flushing the change queue in accordance with the established synchronization policy, yielding synchronized shared data sets.

10 Claims, 20 Drawing Sheets

(56) References Cited

U.S. PATENT DOCUMENTS

| | | | |
|---|---|---|---|
| 9,875,041 B1* | 1/2018 | Redko | G06F 3/0619 |
| 10,235,331 B1* | 3/2019 | Hrebicek | H04L 67/06 |
| 2003/0084361 A1* | 5/2003 | Lawrence | G06F 16/273 |
| | | | 713/400 |
| 2006/0271600 A1* | 11/2006 | Goh | G06F 16/275 |
| 2008/0104140 A1* | 5/2008 | Vierich | G06F 8/71 |
| 2008/0147834 A1* | 6/2008 | Quinn | H04L 67/02 |
| | | | 709/223 |
| 2010/0318495 A1* | 12/2010 | Yan | H04L 67/325 |
| | | | 707/618 |
| 2014/0181301 A1* | 6/2014 | Yendluri | H04L 67/14 |
| | | | 709/225 |
| 2014/0258231 A1* | 9/2014 | Birk | G06F 16/27 |
| | | | 707/634 |
| 2015/0127836 A1* | 5/2015 | Bae | H04L 67/141 |
| | | | 709/227 |
| 2015/0199319 A1* | 7/2015 | Newman | G06F 40/194 |
| | | | 715/255 |
| 2016/0055226 A1* | 2/2016 | Bruening | G06F 16/9024 |
| | | | 707/611 |
| 2016/0087854 A1* | 3/2016 | Jayanti Venkata | H04L 63/102 |
| | | | 709/224 |

\* cited by examiner

PREDICTIVE AND ADAPTIVE QUEUE FLUSHING FOR REAL-TIME DATA RECONCILIATION BETWEEN LOCAL AND REMOTE DATABASES

CROSS-REFERENCE TO RELATED APPLICATIONS

The present application is a continuation-of-and U.S. patent application Ser. No. 14/924,688, titled "REAL-TIME SYNCHRONIZATION OF DATA BETWEEN DISPARATE CLOUD DATA SOURCES", and filed on Oct. 27, 2015, the entire specification of which is incorporated herein by reference in its entirety.

BACKGROUND OF THE INVENTION

Field of the Invention

The present invention is in the field of cloud computing, and more particularly in the field of real-time synchronization of data between local and remote data sources.

Discussion of the State of the Art

The use of computerized databases by business had its beginnings in the 1960s with the development of the SABRE™ system by IBM for American Airline's reservation system. At that time, the database consisted of large sets of flat files that had been individually developed for a specific purpose and the application interface was extremely complex and specifically developed to manipulate the data expected by a single project. The next two decades saw significant advancement in database technology with databases progressing from a large series of files with hard coded relationships to a single file of hierarchically interconnected information or network connected information in the late 1960's to the development of the relational data model in the early 1970s and the resultant database packages such as INGRES™, System R, and Oracle that arose from the relational model in the late 1970s and early 1980s. Of possibly greater importance, however, was that these relational database packages were introduced with languages such as Structured Query Language (SQL) for interacting with the database engines they contained, which greatly simplified the initial set-up of databases, retrieving information from databases and updating data when needed. These packages also came with data storage and maintenance functions pre-programmed allowing end use developers to focus solely on design of database structure rather than the minutia data storage and retrieval. While all of these were significant steps forward, the absence of standardized application programming interface type support for database connectivity still relegated the use of databases to only large projects by large corporations as significant programming specific to the project database by a developer with highly specialized knowledge was still required. The release of such standardized application interfaces for interaction with database management systems such as open database connectivity language and java database connectivity extension which both allow applications to interface with databases largely independent of the database management system vendor in the early 1995 corresponded with the rise of the internet and internet commerce to create a large upturn in database use by small, medium, and large businesses. This large expansion in database use in turn drove the improvement of tools within programming languages such as C C++, Perl, Python, Ruby, and HTML, among others, further reducing the time and cost required for development of applications using databases as a part of their back ends.

Currently databases are used in most aspects of business operations; sales, human resources, inventory, product support, research and development to name some examples, all have multiple commercial software packages available to serve small, medium and large business needs.

A second trend that has resulted in significant increase in the availability of database driven applications to all levels of business is the rise of "cloud computing." In cloud computing, a business, instead of buying their software as a product that they then receive in whole, place on their own hardware and run locally, instead buys the software as a service, paying a monthly or yearly fee to make use of the software much like a subscription to it. In this model, the subscribing business does not have to pay for the purchase and upkeep of their own computer infrastructure, and they don't need to perform their own regular backups of the data they are generating and they do not need to be concerned about software upgrades, especially security upgrades because the software company or "cloud service provider" performs all of those tasks on the cloud provider's infrastructure as part of the service. The great appeal to the subscribing businesses is the extremely low equipment overhead, equipment space savings, greatly reduced size of the IT department needed and scalability—the ability to subscribe a small number of users on the system early on, and add users as growth in the business requires it, or ability to reduce users relatively quickly as needed. An example of a well-established cloud service provider that has made great inroads into the field is SALESFORCE™. SALESFORCE™ is a cloud service provider that offers a complete, generalized customer relationship management system that completely resides in the cloud. Businesses subscribe to number of seats, or users, and in return they receive the use of an instance of SALESFORCE™'s customer relationship database specific for the business' company developed by SALESFORCE™ over their 15 years of operation to have all the needed tables, field and user facing resources to encompass the needs of customer relationship management which include, general new sales lead acquisition, general sales lead tracking, generalized sales relationship handling, generalized equipment contract tracking, general customer support ticket management system, business telephony system, generalized intra business messaging. More recently, SALESFORCE™ also offers limited programming capabilities to allow the subscribing business to change somewhat the look, feel and function of the stock database and user facing interface of their SALESFORCE™ service. Some of these new programming routines allow the direct manipulation of the SALESFORCE™ database from outside of their interface. This progression is typical of the current state of cloud computing.

When keeping databases in synchronization, changed data records in a remote database must be retrieved for reconciliation against a local database so that the data records match. The reciprocal is also true in that changes made to a local database may need to be synchronized against the remote database by uploading data changed locally. Data providers may limit the number of these retrieval API calls that may be performed, requiring intelligent optimization to pace the retrieval operations so that a limited allocation of API calls is not consumed prematurely (leaving any new data changes irretrievable). Additionally, making a retrieval or upload request for every change in a data record is needlessly taxing on hardware resources, and can be more efficiently handled by making fewer requests each for multiple data records.

What is needed is a system that can maintain the synchronization of data from a plurality of data sources in real time, without unnecessarily depleting an allocated number of API calls and with minimal hardware resource usage.

SUMMARY OF THE INVENTION

The inventor has developed a system and method for predictive and adaptive queue flushing for real-time data reconciliation between local and remote databases. The following non-limiting summary of the invention is provided for clarity, and should be construed consistently with embodiments described in the detailed description below.

When keeping multiple databases synchronized, API calls are made to retrieve changed data records from remote data sources and upload records to remote data sources so they may be reconciled against a local database. These retrievals and uploads may be limited by a data provider, for example limiting API calls to 100,000 per day and blocking calls once that limit is exceeded. To maintain synchronization, API calls must be paced optimally so that an allocation of API calls is not exhausted prematurely, while retaining the benefits of real-time data synchronization. It is also more efficient in terms of hardware resources such as processor time, memory, and network utilization to make fewer API calls that are each for multiple data records as opposed to a single call for every change in the data. Using an event queue pacing manager, incoming notification events from local and remote data sources may be tracked within a specified time interval. When data is synchronized, the time interval is ended and stored, and a new time interval begins. These time intervals and their tracked event counts may then be used to calculate an event velocity measurement that describes the rate at which data records were changed during a time interval, and these velocity measurements may then be used to calculate an event acceleration measurement describing how the rate of events have changed across multiple time intervals. This event acceleration measurement may then be modeled as an acceleration curve, along which data may be extrapolated to predict future event velocity measurements and anticipate the flow of data events, enabling more precise dynamic pacing to optimize synchronization operations.

According to a preferred embodiment of the invention, a system for predictive queue flushing for real-time data synchronization between two data stores, comprising: a first data store stored in a memory of and operating on a processor of a first computing device; a second data store stored in a memory of and operating on a processor of a second computing device, wherein the first and second data stores each comprises a shared data set; and a data synchronization system comprising a memory, a processor, and a plurality of software components stored in the memory and operating on the processor, the plurality of software components comprising: a first data synchronization interface communicating via a network with the first data store; a second data synchronization interface communicating via a network with the second data store; a change queue configured to receive change events with timestamps from the first and second data stores and to store them in a first-in-first-out queue, wherein each change event corresponds to a plurality of changes in data of the shared data set at either the first data store or the second data store; a queue monitor configured to monitor the change queue and to feed updated change events and queue status to a query generator and to compute at least an indicia of change velocity; a policy manager configured to establish a synchronization policy for synchronizing the shared data set between the first and second data store based at least in part on the indicia of change velocity, wherein the synchronization policy is drawn from a plurality of synchronization policies stored in a policy database; a query generator configured to determine when to flush the queue based on: the synchronization policy received from the policy manager, the change events received from the change queue, and a queue status with change events received from the queue monitor, to further generate a query by compiling a package of updated queue data before flushing the queue and sending the package of updated queue data as a generated query to either one or both of the synchronization interfaces, whichever is lacking the updated queue data in their respective data store; wherein the change queue is flushed in accordance with the established synchronization policy; and wherein, when the change queue is flushed, the shared data sets of the first data store and of the second data store are synchronized, is disclosed.

According to another preferred embodiment of the invention, a method for predictive queue flushing for real-time data synchronization using a data synchronization system between a first data store and a second data store, the method comprising the following steps: a first data synchronization interface is configured to communicate via a network with the first data store; a second data synchronization interface is configured to communicate via a network with the second data store; a change queue stores change events with timestamps from the first and second data stores as a first-in-first-out queue; a policy manager establishes a synchronization policy for synchronizing a set of shared data between the first and second data store based at least in part on an indicia of change velocity, wherein the synchronization policy is drawn from a plurality of synchronization policies stored in a policy database; a query generator acts upon the synchronization policy established by the policy manager; a queue monitor monitors the first-in-first-out queue and feeds updated change events with timestamps and a queue status to the query generator; the queue monitor computes at least an indicia of change velocity; the queue monitor periodically sends at least an indicia of change velocity to the policy manager; the policy manager periodically directs the query generator to change the existing synchronization policy to a different synchronization policy; the query generator generates a query by compiling a package of updated queue data; the query generator flushes the first-in-first-out queue in accordance with the established synchronization policy; the query generator sends the query to either one or both of the synchronization interfaces, whichever is lacking the updated queue data in their respective data store; and the shared data sets of the first data store and of the second data store are synchronized, is disclosed.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope or the claims herein in any way.

DETAILED DESCRIPTION

Figure 1:
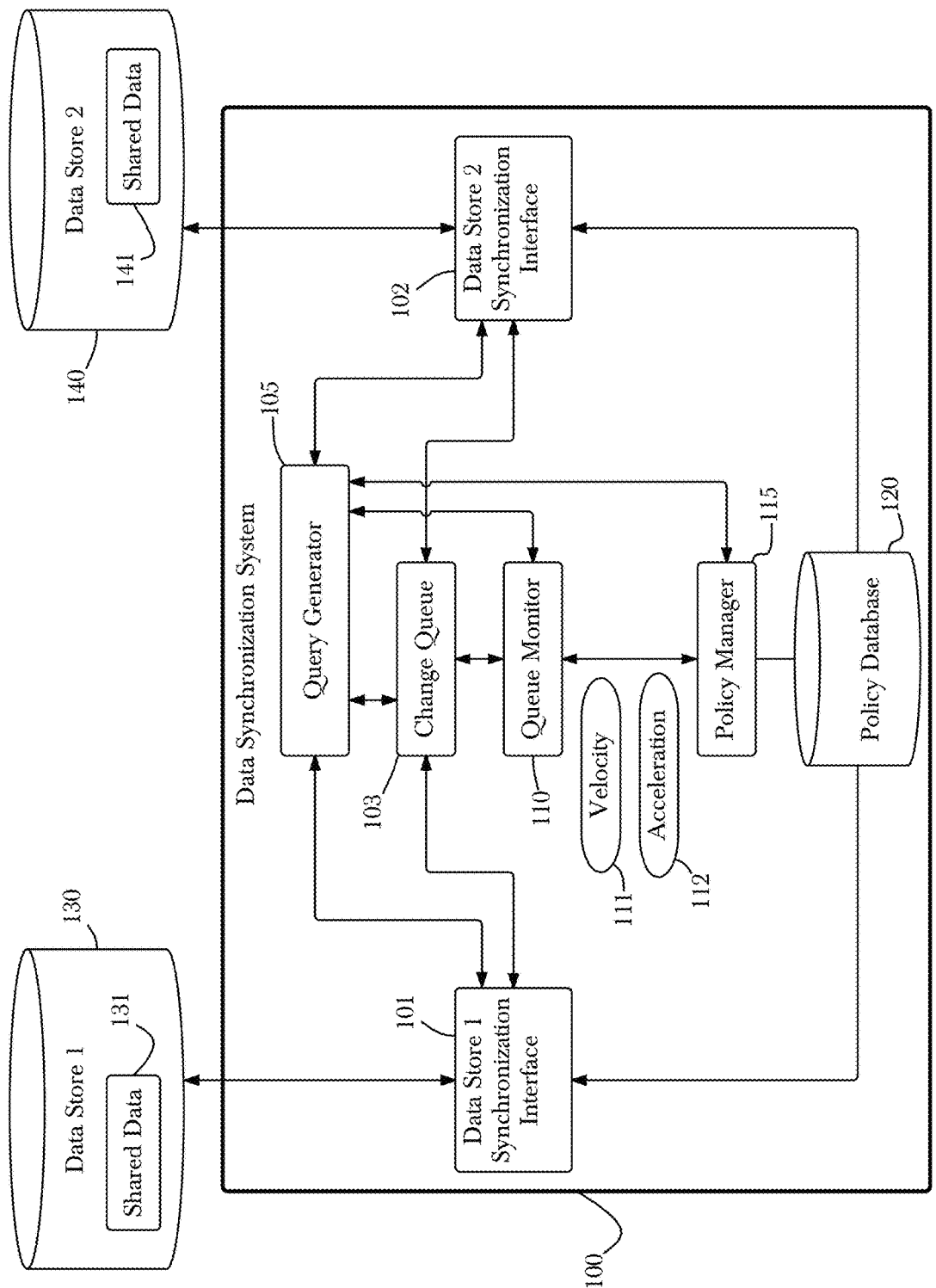
FIG. 1 is a block diagram illustrating an exemplary system architecture for a data synchronization system for predictive queue flushing, according to a preferred embodiment of the invention.

The inventor has conceived, and reduced to practice, various systems and methods for predictive and adaptive queue flushing for real-time data reconciliation between local and remote databases.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "data source" is any remote system that transmits information that is structured in such a way that rules can be applied to insure the reliable and accurate storage of that information in a local database. The "data source" as used here will most often be another, remote, database, but could also be a set of text files on a file server or extensive complex spreadsheet data from within a small sized, medium sized or large sized corporation without departing from the scope of the invention as claimed.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, in a peer to peer arrangement or in a master/slave arrangement common in the art. These examples should make clear that no particular architectural approaches to database management is preferred according to the invention, and choice of data storage technology is at the discretion of each implementer, without departing from the scope of the invention as claimed.

Conceptual Architecture

FIG. 1 is a block diagram of an exemplary architecture for a data synchronization system 100 for predictive queue flushing, according to a preferred embodiment of the invention. According to the embodiment, a first data store 130 comprising a shared data set 131 and a second data store 140 comprising a shared data set 141, wherein the first and second data stores each connect to a data synchronization system 100, the data synchronization system comprising a memory 11, a processor 12, and a plurality of software components stored in the memory 11 and operating on the processor 12, the plurality of software components comprising: a first data synchronization interface 101 communicating via a network with the first data store 130; a second data synchronization interface 102 communicating via a network with the second data store 140; a change queue 103 configured to receive change events with timestamps from the first data store 130 and second data store 140 and to store them in a first-in-first-out queue, wherein each change event corresponds to a plurality of changes in data of the shared data set 131/141 at either the first data store 130 or the second data store 140; a queue monitor 110 configured to monitor the change queue 103 and to feed updated change events and queue status to a query generator 105 and to compute at least an indicia of change velocity 111 and/or acceleration 112; a policy manager 115 configured to establish a synchronization policy for synchronizing the shared data set 131/141 between the first data store 130 and second data store 140 based at least in part on the indicia of change velocity 111 and/or change acceleration 112, wherein the synchronization policy is drawn from a plurality of synchronization policies stored in a policy database; a query generator 105 configured to determine when to flush a queue based on: synchronization policies received from the policy manager 115, change events received from the change queue 103, and queue status with change events received from the queue monitor 110, to further generate a query by compiling a package of updated queue data before flushing and sending a generated query to either one or both of the synchronization interfaces 101/102, whichever is lacking the updated queue data in their respective data store; wherein the change queue 103 is flushed in accordance with the policy manager's 115 established synchronization policy, which may be established based on a plurality of synchronization policies, which may be selected from a set comprising synchronous synchronization, periodic synchronization, and synchronization when change queue reaches a specified length, the synchronization policies being stored in a policy database 120; and wherein, when the change queue 103 is flushed, the shared data sets 131/141 of the first data store 130 and of the second data store 140 are synchronized. The first data store 130 and/or the second data store 140 may be cloud-based data service(s), each comprising an application programming interface with a daily performance limit for third party access and wherein synchronization policies are dynamically established by the policy manager 120 to achieve near-real-time synchronization of the shared data sets 131/141 of the first and second data stores 130/140 without exceeding daily performance limits.

Figure 5:
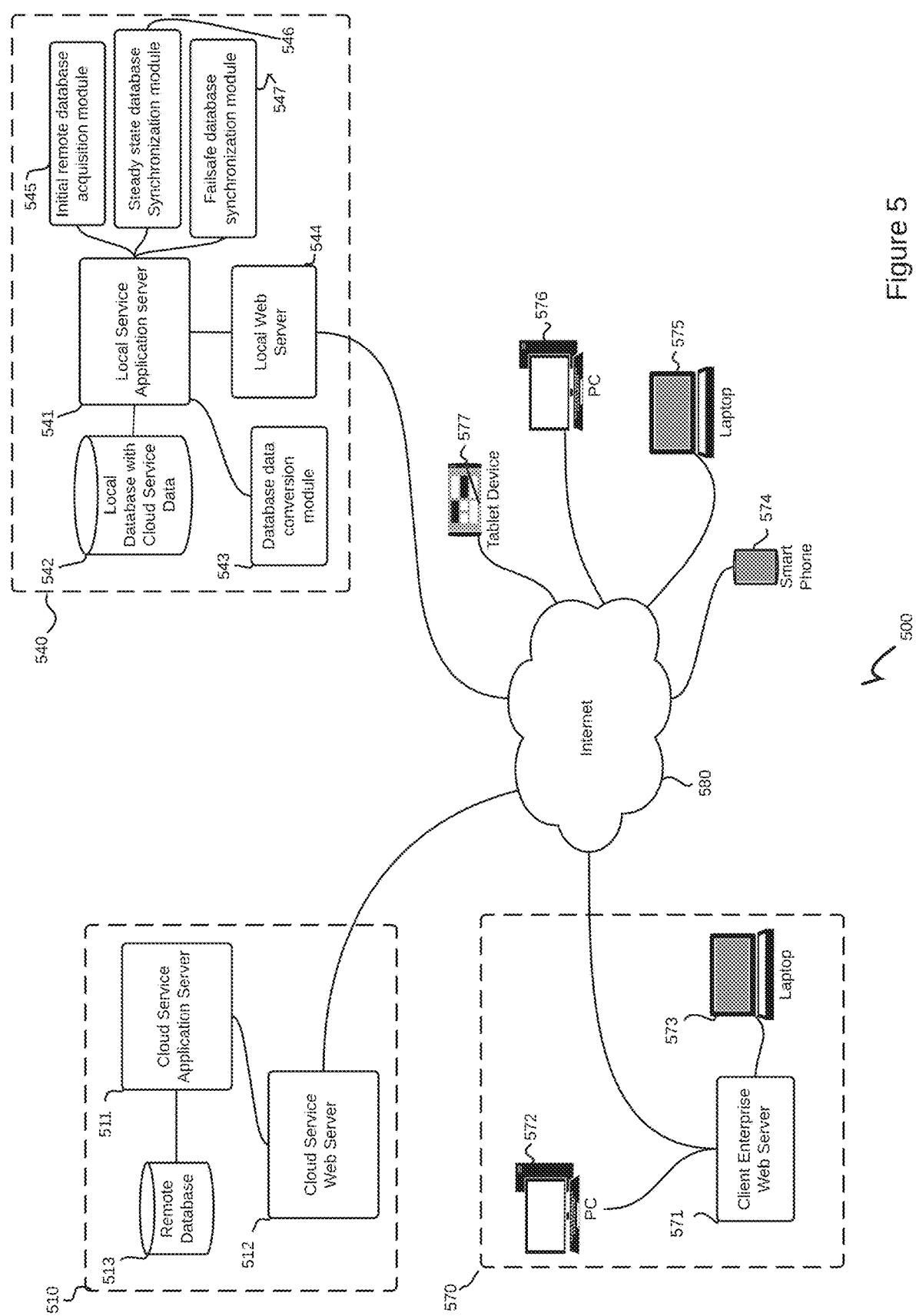
FIG. 5 is a diagram of an exemplary architecture for a system where a local database is managing data from a database of another cloud service vendor as part of a local cloud service according to an embodiment of the invention.

FIG. 5 is a block diagram of an exemplary architecture for a system 500 for real-time synchronization of data between disparate data sources. According to the embodiment, a client enterprise 570 is subscribed to a cloud service provider 510, an example of which might be SALESFORCE™.com, which, among other things, provides data storage 513 for all of enterprise's customer relationship information. As part of the cloud service 510 subscription, the enterprise uses applications provided by the cloud service 511 linked to the database of enterprise customer information 513 within the cloud service provider's infrastructure 510 and served over the internet 580 by the cloud service provider's web servers 512 as the enterprise's repository of potential and existing customer contact information, to track sales leads, to track products and related contracts sold by them to customers, and for customer problem management. As such, the information in this database 510 is used to some extent by all employees within the enterprise 570 through the enterprise's web interface 571 whether the employees are at the enterprise's facilities employing devices that include traditional desktop computers 572 or laptop computers 573 or the employees are remote out in the field using devices such as smart phones 574, laptop computers 575, desktop computers 576 or tablet devices 577 connected using the various available gateways to the internet 580 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the customer relationship management example introduced above, the enterprise may use one cloud service provider's package to track all existing customers' previous sales, problem tickets and to receive inquiries for equipment or services sales that come in through the enterprise's customer support line but to use the software package of another cloud service provider 540 for the capture and cultivation of all new sales leads as that second package is specialized for those tasks and therefore offers many useful features for those operations. One familiar with the art will immediately realize that the function of both cloud software packages depends on the data set that they are both drawing from being functionally identical and that having both services use the same data source, for example, a single database, could serve to noticeably slow the usefulness of both packages and would rely on levels of cooperation that do not exist between the two cloud service providers 510, 540. In this embodiment of the invention, the concurrent use of the same data set by both cloud service providers 510, 540 while maintaining the integrity of the enterprise's 570 master data source 513 is accomplished by the incorporation of the enterprise's entire customer data set into database storage system 542 of the second, local cloud service provider 540. At initial set up of the local cloud provider's service, the provider's local application server 541 uses an initial master database acquisition software module 545 to request the bulk transfer of the enterprise's 570 entire customer data set 513 from the first cloud service provider 510 over the internet 580 through the local cloud service provider's web server interface 544. This initial acquisition task might use a specialized bulk download call provided by the first cloud service's application programming interface 511, if one is available. This task may also make use of REST based, SOAP based, or other, proprietary type requests provided by the first cloud service provider for smaller data downloads to transfer the entire remote data set 513 either at initial set up of the novel cloud service database, or during the course of transactions where the data needed is present in the master database but not yet present in the novel cloud service's local database, as necessary and desired. Indeed, any method of electronic data transfer from the first cloud service provider to the local cloud service provider known to those familiar to the art, could be used as the invention does not depend on any specific protocol. As the designs of two independently developed data sources are invariably heterogeneous, often related to the specific use to which they are employed, it is expected that a database conversion module 543 will be used to convert all data flowing between the local cloud service's database 542 and the first cloud service's database 513, both during the initial local database acquisition operation and during the subsequent synchronization operations required to insure data integrity of both databases 542, 513 in production use. Once in production, it would be expected that use of the local cloud service 540 applications 541 by the employees 572, 573, 574, 575, 576, 577 of the enterprise will introduce a plurality of changes to the local cloud provider's 540 representation of the enterprise's data 542 while continued use of the first cloud provider's 510 applications 511 by the enterprise's employees 572, 573, 574, 575, 576, 577 will lead to non-matching changes to the first cloud provider's representation of the enterprise's data 513. A system of robust synchronization software has been developed to insure that both the remote database 513 and the local database 542 have the same data in real time. The steady state database synchronization software module 546 monitors for and uses messages issued by other cloud service providers 510 that announce changes to their database 513, to incorporate those changes into the local database 542. If those messages include the data record that has changed, that is used by the database data conversion software module 543 in the local database integration process. Otherwise, if the changed data is not included with the change message sent by the other cloud service provider 510, the steady state database synchronization software module 546, upon receiving the message, will request the changed data from the source 510 and upon receipt, that data will be converted 543 and incorporated into the local database 542. While the steady state database synchronization software module 546 is used by the invention to process change messages from other cloud service providers 510 and incorporate the data into the local database is present, this should not be interpreted to mean that the invention is dependent on the other cloud service providing such messages, the invention can use other means to obtain changes made to the remote database 513 and is not dependent on messages being sent. Conversely, changes made to the local database 542 during production use are converted to the design of the remote cloud provider's data source 513 and then incorporated into the other cloud service provider's 510 database 513 by application programming interface call. In rapidly changing stateless communications like those just outlined, information can be lost as messages are not delivered, due to packets being dropped 580, server workload 511, 512, 513, 541, 542, 543, 544 or complete outages of either communication hardware or server hardware. It is the function of the failsafe database synchronization software module 547 to insure that both databases are current. The failsafe database synchronization module 547 possesses routines for both the timed confirmation of database synchronization and recovery of synchronization after functional communication failure of unforeseen period. The timed confirmation routine repetitively waits a predetermined interval of time, for example 30 minutes, and then polls both databases 513, 542 for all changes made during that period. Changes supplied by both databases are then compared and corresponding, incorporated changes are removed. Remaining changes to either the remote database 513 or local database 542 are then reconciled in case of multiple changes to the same records and the net changes incorporated as determined. In the case of communication loss between the two databases, the failsafe database synchronization software module 547 records the start time of the outage and then the time that functional communications are restored. As with the recurring timed process, changes made to either the remote database 513 or the local database 542 are compared to remove any changes that have been resolved and the remaining changes reconciled at the record and field level to insure the incorporated data reflects the most current status as determined by the process.

Figure 6:
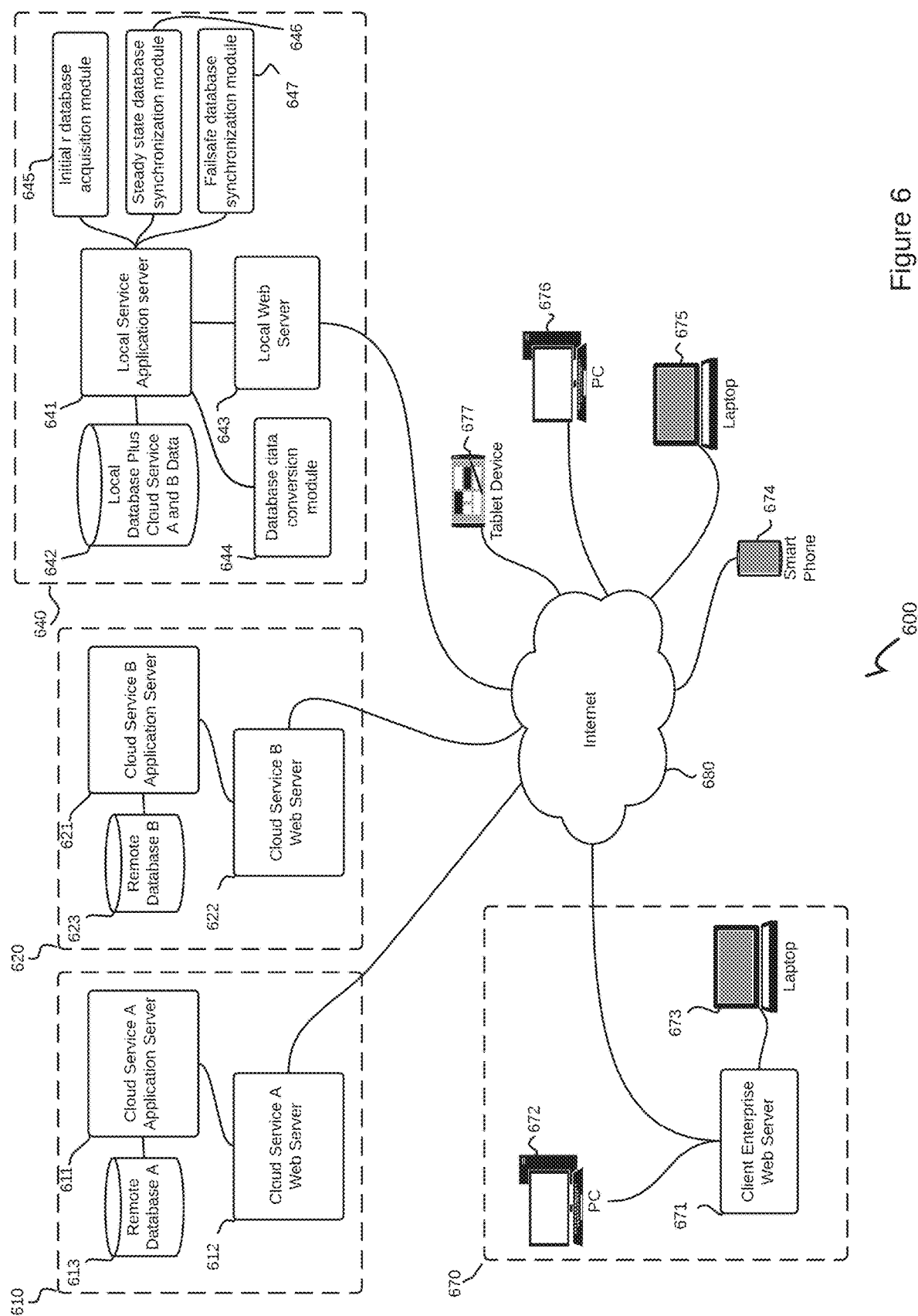
FIG. 6 is a diagram of an exemplary architecture for a system where a local database is managing data from databases of a plurality of cloud service vendors as part of a local cloud service according to an embodiment of the invention.

FIG. 6 is a block diagram of a preferred architecture for a system 600 for real-time synchronization of data between disparate data sources. According to the embodiment, a client enterprise 670 is subscribed to a plurality of cloud service providers 610, 620 which, among other things, provide data storage for all of enterprise's customer relationship information for their heavy equipment division 613 and their hazardous material response equipment division 623. As part of the cloud service 610 subscription, the enterprise's heavy equipment division uses applications provided by the cloud service 611 linked to the database of heavy equipment division's customer information 613 within the cloud service provider's infrastructure 610 and served over the internet 680 by the cloud service provider's web servers 612 as the heavy equipment division's repository of potential and existing customer contact information, to track sales leads, to track products and related contracts sold by them to customers, and for customer problem management. As such, the information in this database 610 is used to some extent by all employees within the heavy equipment division within the enterprise 670 through the enterprise's web interface 671 whether the those employees are at the enterprise's facilities employing devices that include traditional desktop computers 672 or laptop computers 673 or those employees are remote out in the field using devices such as smart phones 674, laptop computers 675, desktop computers 676 or tablet devices 677 connected using the various available gateways to the internet 680 known to the art and the database is subject to continuous data changes which are vital to the function of the enterprise.

Likewise, as part of the cloud service subscription with cloud service provider B 620, the enterprise's hazardous materials response division uses applications provided by second cloud service 621 linked to remote database B of hazardous materials response division's customer information 623 within the second cloud service provider's infrastructure 620 and served over the internet 680 by the cloud service provider's web servers 622 as the hazardous materials response division's repository of potential and existing customer contact information, to track sales leads, to track products and related contracts sold by them to customers, and for customer problem management. As such, the information in this database 620 is used to some extent by all employees within the hazardous materials response division within the enterprise 670 through the enterprise's web interface 671 whether the those employees are at the enterprise's facilities employing devices that include traditional desktop computers 672 or laptop computers 673 or those employees are remote out in the field using devices such as smart phones 674, laptop computers 675, desktop computers 676 or tablet devices 677 connected using the various available gateways to the internet 680 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the customer relationship management example introduced above, one division of the enterprise may use one cloud service provider's package to track all existing customers' previous sales, problem tickets and to receive inquiries for equipment or services sales that come in through the enterprise's customer support line 610 while a second division uses another cloud service provider for the same purposes 620 for a plurality of reasons. It may then become highly advantageous for the entire enterprise to use the software package of a third cloud service provider 640 for example, the capture and cultivation of all new sales leads as that third package is specialized for those tasks and therefore offers many useful features for those operations. One familiar with the art will immediately realize that the function of the three cloud software packages depends on the entire data set that the third cloud provider draws fully from and the other cloud providers draw partially from being functionally identical and that individual portions derived from the provider A 610 and provider B 620 in the local database 642 mirror the remote data sources 610, 620 exactly. In the embodiment, the concurrent use of the same data set by three cloud service providers 610, 620, 640 while maintaining the integrity of the enterprise's 670 remote data sources 613, 623 is accomplished by the incorporation of both portions of the enterprise's entire customer data set into database storage system 642 of the local cloud service provider 640. At initial set up of the local cloud provider's service, the provider's local application server 641 uses an initial remote database acquisition software module 645 to request the bulk transfer of the enterprise's 670 entire customer data set 613, 623 from cloud service provider A 610 and cloud service provider B 620 over the internet 680 through the local cloud service provider's web server interface 644. This initial acquisition task might use a specialized bulk download call provided by the cloud services' application programming interfaces 611, 621, if one is available. This task also make use of REST, SOAP, stream-based, or other similar API/protocol requests provided by the other cloud service providers for smaller data downloads to transfer the entire remote data set 613, 623 if necessary. Indeed, any method of electronic data transfer from the first cloud service provider to the local cloud service provider known to those familiar to the art, could be used as the invention does not depend on any specific protocol. As the designs of two independently developed data sources are invariably heterogeneous, often related to the specific use to which they are employed, it is expected that a database conversion module 643 will be used to convert all data flowing between the local cloud service's database 642 and the other cloud services' databases 613, 623 both during the initial local database acquisition operation and during the subsequent synchronization operations required to insure data integrity of all three databases 642, 613, 623 in production use. Once in production, it would be expected that use of the local cloud service 640 applications 641 by the employees 672, 673, 674, 675, 676, 677 of the enterprise will introduce a plurality of changes to the local cloud provider's 640 representation of the enterprise's data 642 while continued use of the other two cloud providers' 610, 620 applications 611, 621 by the enterprise's employees 672, 673, 674, 675, 676, 677 will lead to non-matching changes to the first two cloud providers' partial representations of the enterprise's data 613, 623. A system of robust synchronization software has been developed as part of the invention to insure that both the remote databases 613, 623 and the local database 642 have the same data in real time. The steady state database synchronization software module 646 monitors for and uses messages issued by other cloud service providers' 610, 620 that announce changes to their databases 613, 623 to incorporate those changes into the local database 642. If those messages include the data record that has changed, that is used by the database data conversion software module 643 in the local database integration process. Otherwise, if the changed data is not included with the change message sent by the other cloud service providers 610, 620 the steady state database synchronization software module 646, upon receiving the message, will request the changed data from the sources 610, 620 and upon receipt, that data will be converted 643 and incorporated into the local database 642. While the steady state database synchronization software module 646 is used by the invention to process change messages from other cloud service providers 610, 620 and incorporate the data into the local database is present, this should not be interpreted to mean that the invention is dependent on the other cloud service providing such messages, the invention can use other means to obtain changes made to the remote databases 613, 623 and is not dependent on messages being sent. Conversely, changes made to the local database 642 during production use are converted to the design of the remote cloud providers' data sources 613 and then incorporated into the other cloud service provider's 610, 620 database 613, 623 by application programming interface call. In rapidly changing stateless communications like those just outlined, information can be lost as messages are not delivered, due to packets being dropped 680, server workload 611, 612, 613, 621, 622, 623, 641, 642, 643, 644 or complete outages of either communication hardware or server hardware. It is the function of the failsafe database synchronization software module 647 to insure that both databases are current. The failsafe database synchronization module 647 possesses routines for both the timed confirmation of database synchronization and recovery of synchronization after functional communication failure of unforeseen period. The timed confirmation routine repetitively waits a predetermined interval of time, for example 30 minutes, and then polls all three databases 613, 623, 642 for all changes made during that period. Changes supplied by the databases are then compared and corresponding, incorporated changes are removed. Remaining changes to either remote database 613, 623 or local database 642 are then reconciled in case of multiple changes to the same records and the net changes incorporated as determined. In the case of communication loss between the any two or all three databases, the failsafe database synchronization software module 647 records the start time of the outage and then the time that functional communications are restored. As with the recurring timed process, changes made to either remote database 613, 623 or the local database 642 are compared to remove any changes that have been resolved and the remaining changes reconciled at the record and field level to insure the incorporated data reflects the most current status as determined by the process.

Figure 7:
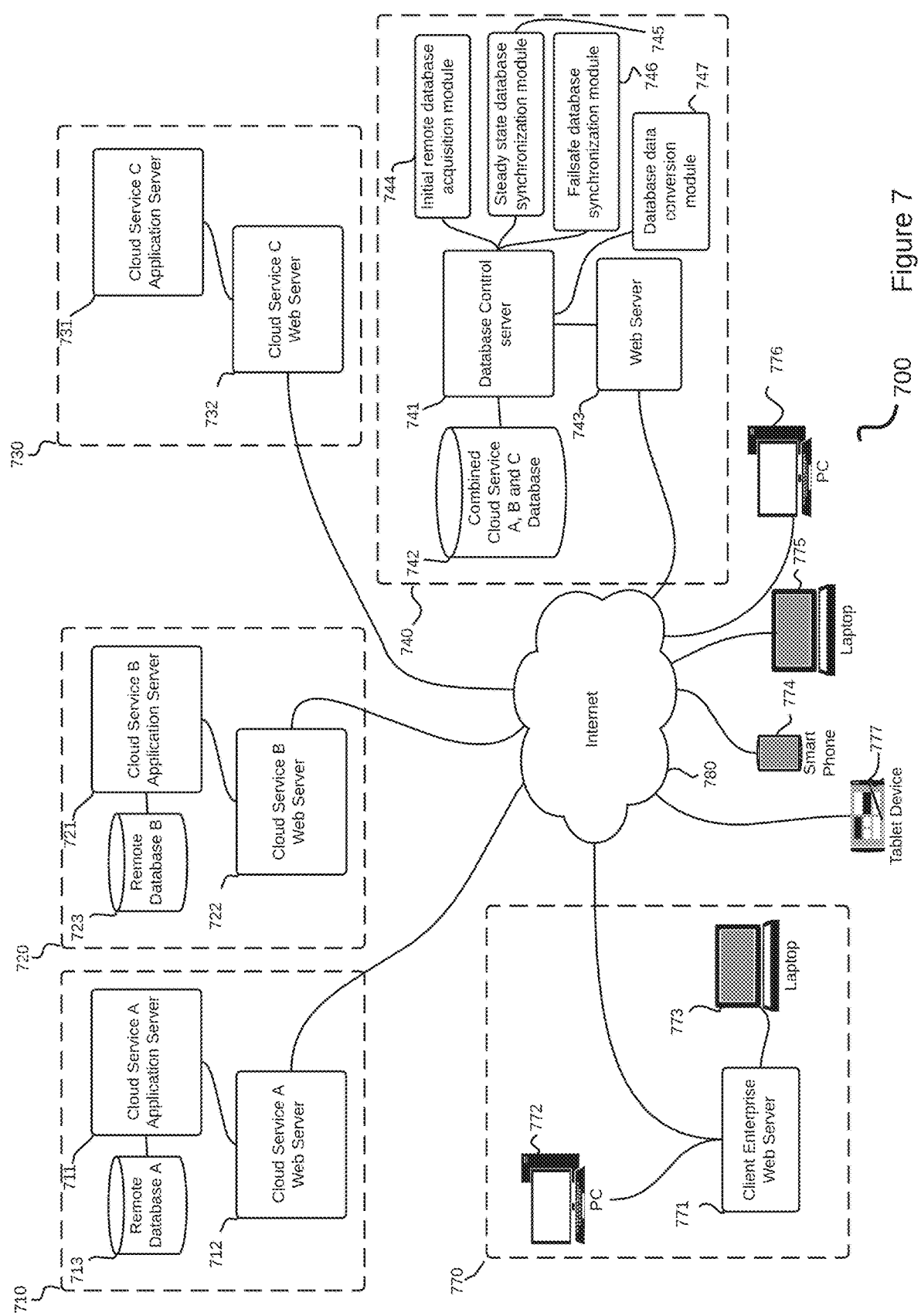
FIG. 7 is a diagram of an exemplary architecture for a system where a local database is one of a plurality of cloud service based databases managed within a centralized database which might host data employed by a plurality of additional cloud based services according to an embodiment of the invention.

FIG. 7 is a block diagram of another preferred architecture for a system 700 for real-time synchronization of data between disparate data sources. According to the embodiment, a client enterprise 770 is subscribed to a plurality of cloud service providers 710, 720 which, among other things, provide data storage for all of enterprise's package shipment tracking information for their heavy freight division 713 and their rapid delivery division 723. As part of the cloud service 710 subscription, the enterprise's heavy freight division uses applications provided by cloud service A 711 linked to the database of heavy freight division's container information 713 within the cloud service provider's infrastructure 710 and served over the internet 780 by the cloud service provider's web servers 712 as the heavy freight division's repository of shipper and recipient contact information, to track scheduled pickups, to track shipments and related shipper paperwork, and for shipment problem management. As such, the information in this database 710 is used to some extent by all employees within the heavy freight division within the enterprise 770 through the enterprise's web interface 771 whether the those employees are at the enterprise's facilities employing devices that include traditional desktop computers 772 or laptop computers 773 or those employees are remote out in the field using devices such as smart phones 774, laptop computers 775, desktop computers 776 or tablet devices 777 connected using the various available gateways to the internet 780 known to the art and the database is subject to continuous data changes which are vital to the function of the enterprise.

Likewise, as part of the cloud service subscription with cloud service provider B 720, the enterprise's rapid delivery division uses applications provided by second cloud service 721 linked to remote database B of rapid shipment division's shipping information 723 within the second cloud service provider's infrastructure 720 and served over the internet 780 by the cloud service provider's web servers 722 as the rapid shipment division's repository of shipper and recipient contact information, to track scheduled pickups, to track shipments and related shipper paperwork, and for shipment problem management. As such, the information in this database 720 is used to some extent by all employees within the hazardous materials response division within the enterprise 770 through the enterprise's web interface 771 whether the those employees are at the enterprise's facilities employing devices that include traditional desktop computers 772 or laptop computers 773 or those employees are remote out in the field using devices such as smart phones 774, laptop computers 775, desktop computers 776 or tablet devices 777 connected using the various available gateways to the internet 780 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the shipping information example introduced above, one division of the enterprise may use one cloud service provider's package to track all existing shippers and recipients, shipments, problem tickets and to receive new pickup requests that come in through the enterprise's customer support line 710 while a second division uses another cloud service provider for the same purposes 720 for a plurality of reasons. It may then become highly advantageous for the entire enterprise to use the software package of a third cloud service provider 730 for example, to capture and store pictorial data which the two original databases were ill equipped to handle and provide select public facing data on all packages as part of an emergency response initiative. Instead of having closed, local, data storage hardware, this third cloud service provider, C, uses their standalone database service to which they act as a client 740 and which may or may not also serve the same data to other cloud service providers that the enterprise 770 uses. One familiar with the art will immediately realize that the function of the three cloud software packages depends on the entire data set, which the third cloud provider draws fully from and the other cloud providers draw partially from being functionally identical and that individual portions derived from the provider A 710 and provider B 720 in cloud service C's standalone database system 742 mirror the remote data sources 710, 720 exactly. In the embodiment, the concurrent use of the same data set by three cloud service providers 710, 720 while maintaining the integrity of the enterprise's 770 remote data sources 713, 723 is accomplished by the incorporation of both portions of the enterprise's entire customer data set into standalone database storage system 742 of the cloud service provider C 740. At initial set up of the local cloud provider's service, the standalone data storage system's database controller 741 uses an initial master database acquisition software module 744 to request the bulk transfer of the enterprise's 770 entire customer data set 713, 723 from cloud service provider A 710 and cloud service provider B 720 over the internet 780 through the standalone data storage system's web server interface 743. This initial acquisition task might use a specialized bulk download call provided by the cloud services' application programming interfaces 711, 721, if one is available. This task also make use of REST based, SOAP based, or streaming API-based (or any other appropriate protocol known in the art) requests provided by the cloud service providers A or B for smaller data downloads to transfer the entire remote data set 713, 723 if necessary. Indeed, any method of electronic data transfer from the first cloud service provider to the standalone data storage system known to those familiar to the art, could be used as the invention does not depend on any specific protocol. As the designs of three independently developed data sources are invariably heterogeneous, often related to the specific use to which they are employed, it is expected that a database conversion module 747 will be used to convert all data flowing between the standalone data storage system's database 742 and the other cloud services' databases 713, 723 both during the initial local database acquisition operation and during the subsequent synchronization operations required to insure data integrity of all three databases 742, 713, 723 in production use. Once in production, it would be expected that use of the standalone data storage system 740 by applications of cloud storage provider C 731 by the employees 772, 773, 774, 775, 776, 777 of the enterprise will introduce a plurality of changes to cloud service provider C's 740 representation of the enterprise's data 742 while continued use of the other two cloud providers' 710, 720 applications 711, 721 by the enterprise's employees 772, 773, 774, 775, 776, 777 will lead to non-matching changes to the first two cloud providers' partial representations of the enterprise's data set 713, 723. A system of robust synchronization software has been developed as part of the invention to insure that both the remote databases 713, 723 and the standalone database 742 have the same data in real time. The steady state database synchronization software module 745 monitors for and uses messages issued by other cloud service providers' 710, 720 that announce changes to their databases 713, 723 to incorporate those changes into the standalone database 742. If those messages include the data record that has changed, that record is used by the database data conversion software module 747 in the standalone data storage system's integration process. Otherwise, if the changed data is not included with the change message sent by the other cloud service providers 710, 720 the steady state database synchronization software module 745, upon receiving the message, will request the changed data from the sources 710, 720 and upon receipt, that data will be converted 747 and incorporated into the standalone database 742. While the steady state database synchronization software module 745 is used by the invention to process change messages from other cloud service providers 710, 720 and incorporate the data into the local database is present, this should not be interpreted to mean that the invention is dependent on the other cloud service providing such messages, the invention can use other means to obtain changes made to the remote databases 713, 723 and is not dependent on messages being sent. Conversely, changes made to the standalone database 742 during production use are converted to the design of the remote cloud providers' data sources 713, 723 and then incorporated into the other cloud service provider's 710, 720 database 713, 723 by application programming interface call. In rapidly changing stateless communications like those just outlined, information can be lost as messages are not delivered, due to packets being dropped 780, server workload 711, 712, 713, 721, 722, 723, 741, 742, 743, or complete outages of either communication hardware or server hardware. It is the function of the failsafe database synchronization software module 746 to insure that all databases are current. The failsafe database synchronization module 746 possesses routines for both the timed confirmation of database synchronization and recovery of synchronization after functional communication failure of unforeseen period. The timed confirmation routine repetitively waits a predetermined interval of time, for example 30 minutes, and then polls all databases 713, 723, 742 for all changes made during that period. Changes supplied by the databases are then compared and corresponding, incorporated changes are removed. Remaining changes to either remote databases 713, 723 or standalone database 742 are then reconciled in case of multiple changes to the same records and the net changes incorporated as determined. In the case of communication loss between the any two or all three databases, the failsafe database synchronization software module 746 records the start time of the outage and then the time that functional communications are restored. As with the recurring timed process, changes made to either remote database 713, 723 or the standalone system database 742 are compared to remove any changes that have been resolved and the remaining changes reconciled at the record and field level to insure the incorporated data reflects the most current status as determined by the process.

Figure 8:
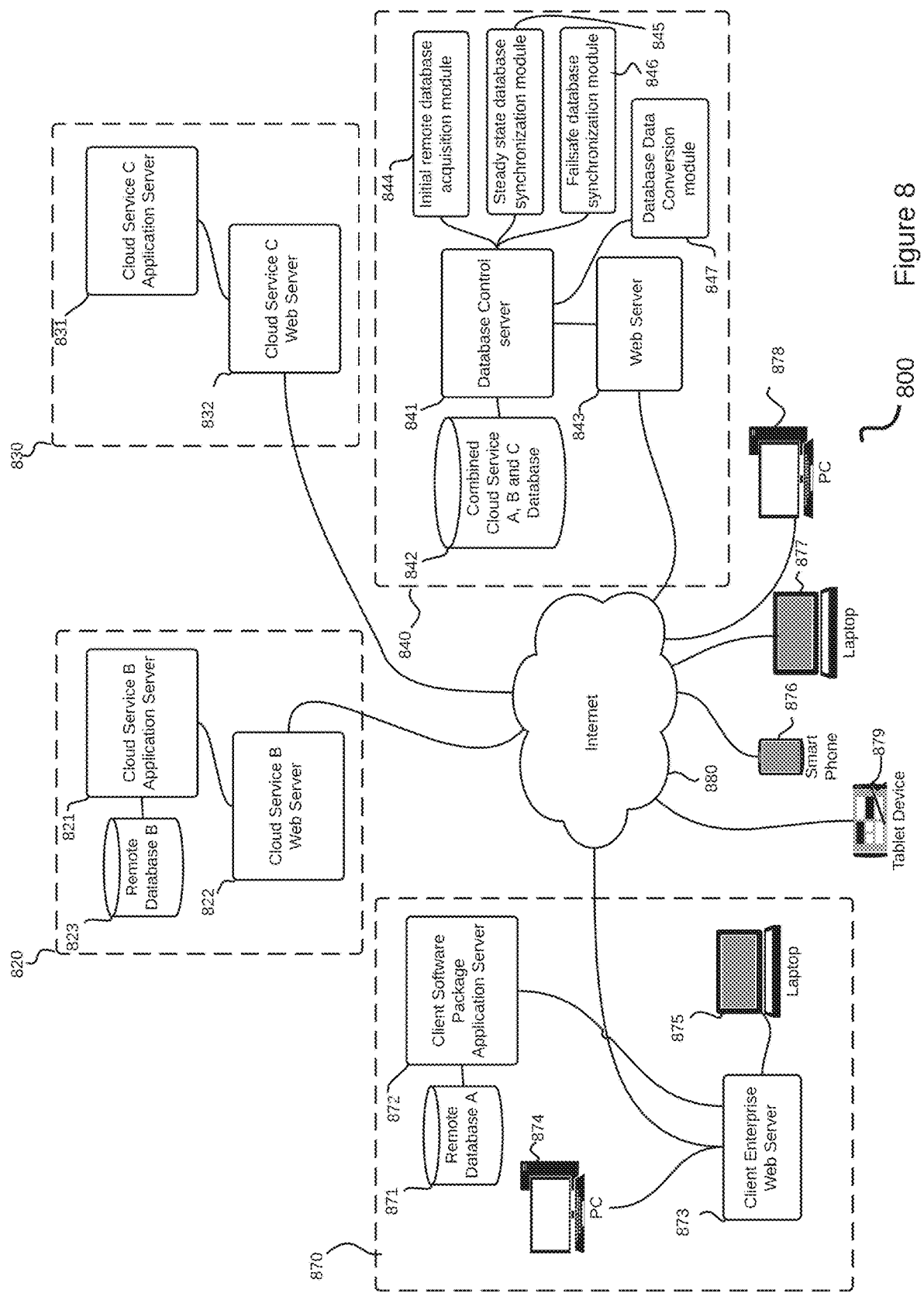
FIG. 8 is a diagram of an exemplary architecture for a system where a local database and client software package database are two of a plurality of databases managed within a centralized database which might host data employed by a plurality of additional cloud based services according to an embodiment of the invention.

FIG. 8 is a block diagram of another preferred architecture for a system 800 for real-time synchronization of data between disparate data sources. According to the embodiment, a client enterprise 870 is subscribed to a cloud service provider 820 which, among other things, provides data storage for all of enterprise's package shipment tracking information for their heavy freight division 813. The enterprise's rapid delivery division uses an in-house system 872 and attached database 871 to provide the same information. As part of the cloud service 820 subscription, the enterprise's heavy freight division uses applications provided by cloud service A 821 linked to the database of heavy freight division's container information 823 within the cloud service provider's infrastructure 820 and served over the internet 880 by the cloud service provider's web servers 822 as the heavy freight division's repository of shipper and recipient contact information, to track scheduled pickups, to track shipments and related shipper paperwork, and for shipment problem management. As such, the information in this database 820 is used to some extent by all employees within the heavy freight division within the enterprise 870 through the enterprise's web interface 873 whether the those employees are at the enterprise's facilities employing devices that include traditional desktop computers 874 or laptop computers 875 or those employees are remote out in the field using devices such as smart phones 876, laptop computers 877, desktop computers 878 or tablet devices 879 connected using the various available gateways to the internet 880 known to the art and the database is subject to continuous data changes which are vital to the function of the enterprise.

Similarly, as part of the in-house shipment tracking application 872, the enterprise's rapid delivery division uses data stored in the attached remote database A as their repository of shipper and recipient contact information, to track scheduled pickups, to track shipments and related shipper paperwork, and for shipment problem management. As such, the information in this database 871 is used to some extent by all employees within the hazardous materials response division within the enterprise 870 through the enterprise's network whether the those employees are at the enterprise's facilities employing devices that include traditional desktop computers 874 or laptop computers 875 or those employees are remote out in the field using devices such as smart phones 876, laptop computers 877, desktop computers 878 or tablet devices 879 connected using the various available gateways to the internet 880 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the shipping information example introduced above, one division of the enterprise may use one cloud service provider's package to track all existing shippers and recipients, shipments, problem tickets and to receive new pickup requests that come in through the enterprise's customer support line 820 while a second division uses internal software for the same purposes 872, 873 for a plurality of reasons. It may then become highly advantageous for the entire enterprise to use the software package of a third cloud service provider 830 for example, to capture and store pictorial data which the two original databases are ill equipped to handle and provide select public facing data on all packages as part of an emergency response initiative. Instead of having closed, local, data storage hardware, this third cloud service provider, C, uses their standalone database service to which they act as a client 840 and which may or may not also serve the same data to other cloud service providers that the enterprise 870 uses. One familiar with the art will immediately realize that the function of the three cloud software packages depends on the entire data set, which the third cloud provider draws fully from and the other cloud providers draw partially from, being functionally identical and that individual portions derived from the provider A 820 and the internal database 871 in cloud service C's standalone database system 842 mirror the remote data sources 820, 871 exactly. In the embodiment, the concurrent use of the same data set by three data storage systems 820, 871, 840 while maintaining the integrity of the enterprise's 870 remote data sources 871, 823 is accomplished by the incorporation of both portions of the enterprise's entire customer data set into standalone database storage system 842 of the cloud service provider C 840. At initial set up of the local cloud provider's service, the standalone data storage system's database controller 841 uses an initial remote database acquisition software module 844 to request the bulk transfer of the enterprise's 870 entire customer data set 871, 823 from cloud service provider A 820 and the internal data storage system 871 over the internet 880 through the standalone data storage system's web server interface 843. This initial acquisition task might use a specialized bulk download call provided by the cloud service's application programming interface 821, and the application programming interface of the internal software 872, if one is available. This task also make use of REST based, SOAP based or streaming based requests provided by the cloud service provider A or the internal software package 872 for smaller data downloads to transfer the entire remote data set 872, 823 if necessary. Indeed, any method of electronic data transfer from the first cloud service provider to the standalone data storage system known to those familiar to the art, could be used as the invention does not depend on any specific protocol. As the designs of three independently developed data sources are invariably heterogeneous, often related to the specific use to which they are employed, it is expected that a database conversion module 847 will be used to convert all data flowing between the standalone data storage system's database 842 and the databases 872, 823 both during the initial local database acquisition operation and during the subsequent synchronization operations required to insure data integrity of all three databases 842, 872, 823 in production use. Once in production, it would be expected that use of the standalone data storage system 840 by applications of cloud storage provider C 831 by the employees 874, 875, 876, 877, 878, 879 of the enterprise will introduce a plurality of changes to cloud service provider C's 840 representation of the enterprise's data 842 while continued use of the other two 871, 820 applications 871, 821 by the enterprise's employees 874, 875, 876, 877, 878, 879 will lead to non-matching changes to the two other databases' partial representations of the enterprise's data set 871, 823. A system of robust synchronization software has been developed as part of the invention to insure that all remote databases 871, 823 and the standalone database 842 have the same data in real time. The steady state database synchronization software module 845 monitors for and uses messages issued by other software packages 872, 821 that announce changes to their databases 871, 823 to incorporate those changes into the standalone database 842. If those messages include the data record that has changed, that record is used by the database data conversion software module 847 in the standalone data storage system's integration process. Otherwise, if the changed data is not included with the change message sent by the other software packages 872, 820 the steady state database synchronization software module 845, upon receiving the message, will request the changed data from the sources 870, 820 and upon receipt, that data will be converted 847 and incorporated into the standalone database 842. While the steady state database synchronization software module 845 is used by the invention to process change messages from other software packages providers 870, 820 and incorporate the data into the local database is present, this should not be interpreted to mean that the invention is dependent on the other cloud service providing such messages, the invention can use other means to obtain changes made to the remote databases 871, 823 and is not dependent on messages being sent. Conversely, changes made to the standalone database 842 during production use are converted to the design of the remote data sources 871, 823 and then incorporated into the other databases 871, 823 by application programming interface calls. In rapidly changing stateless communications like those just outlined, information can be lost as messages are not delivered, due to packets being dropped 880, server workload 871, 872, 873, 821, 822, 823, 841, 842, 843, or complete outages of either communication hardware or server hardware. It is the function of the failsafe database synchronization software module 846 to insure that all databases are current. The failsafe database synchronization module 846 possesses routines for both the timed confirmation of database synchronization and recovery of synchronization after functional communication failure of unforeseen period. The timed confirmation routine repetitively waits a predetermined interval of time, for example 30 minutes, and then polls all databases 871, 823, 842 for all changes made during that period. Changes supplied by the databases are then compared and correspondingly, incorporated changes are removed. Remaining changes to either remote databases 871, 823 or standalone database 842 are then reconciled in case of multiple changes to the same records and the net changes incorporated as determined. In the case of communication loss between the any two or all three databases, the failsafe database synchronization software module 846 records the start time of the outage and then the time that functional communications are restored. As with the recurring timed process, changes made to either remote database 871, 823 or the standalone system database 842 are compared to remove any changes that have been resolved and the remaining changes reconciled at the record and field level to insure the incorporated data reflects the most current status as determined by the process.

Those skilled in the art will realize that, although aspects of customer relationship management have been used above as an example of one area where the invention could be used, the invention is in no way limited in usefulness to this exemplary area. The examples could equally well have been inventory and occupancy of rooms on ships in a cruise ship line or to manage facets of airline reservations and operations.

Figure 14:
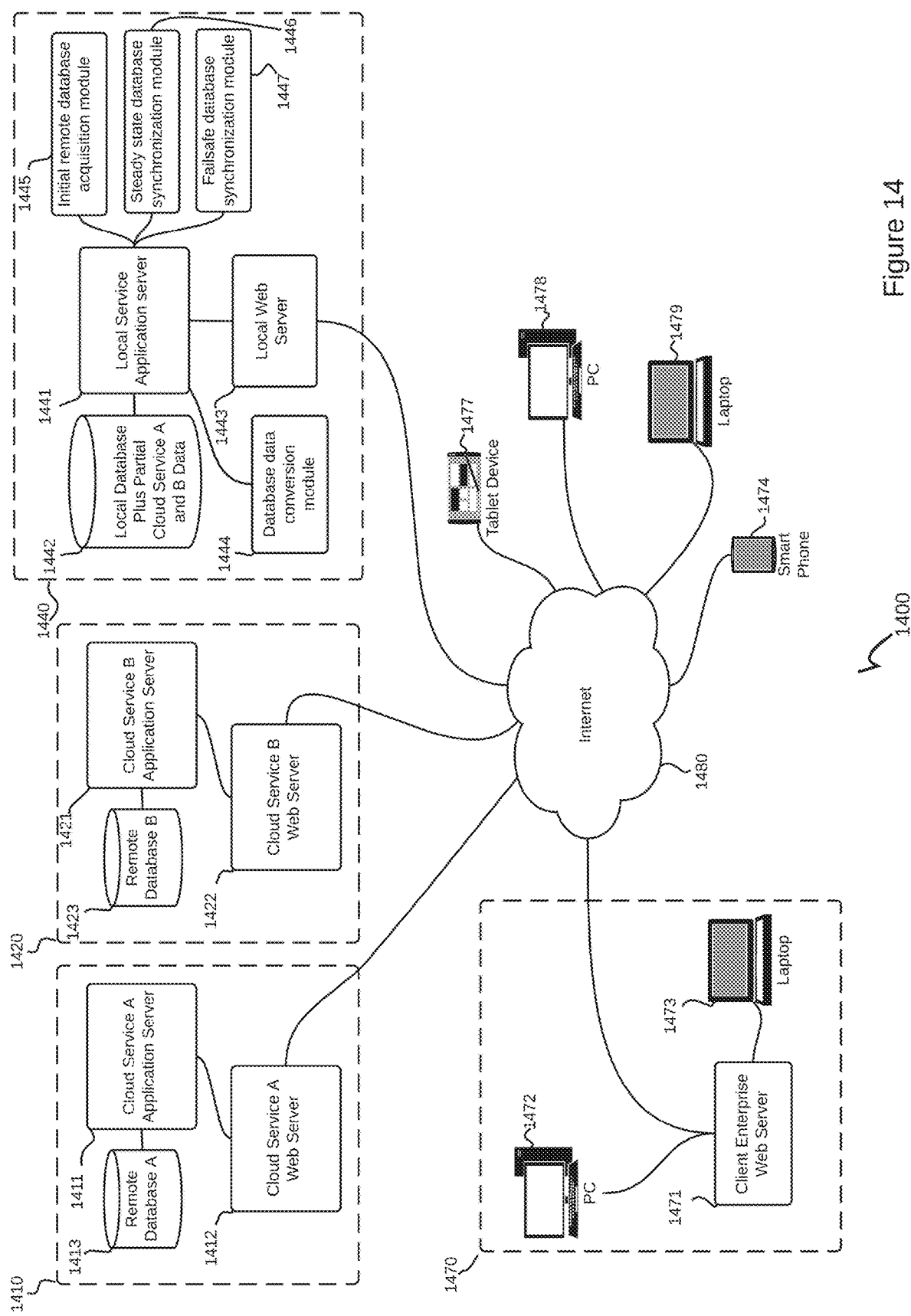
FIG. 14 is a diagram of an exemplary architecture for a system where a local cloud service replies to a query that requires information not present in the local database by issuing derived queries to databases of a plurality of cloud service vendors as part of a local cloud service according to an embodiment of the invention.

FIG. 14 is a block diagram of another preferred architecture for a system 1400 for real-time synchronization of data between disparate data sources. According to the embodiment, a client enterprise 1470 is subscribed to multiple cloud service providers 1410, 1420, 1440 each with its own database 1413, 1423, 1442 each of which maintains the information needed to carry out the functions the cloud services provide. Those knowledgeable in the art will agree that these individual cloud service databases are likely to possess some amount of data in common and a plurality of data that is unique to one of the databases alone. It can be easily imagined that over time in business needs will arise for retrieving existing data using novel methods or parameters that were not preplanned and for which a single database schema does not exist. As an extremely simple illustrative example, the database 1413 of cloud service A 1410 may have, as part of the data tracked, the names and addresses of all customers and prospects for a subscribing business 1470. The database 1423 of cloud service B 1420 may, as part of the data tracked, have the names of all customers as well as all of the purchases and the promotional purchase discount each of the customers have made from the subscribing business 1470. The marketing department, which uses cloud service provider C 1440 and its database 1442, an embodiment of the invention, develops a sales campaign where customers who purchase products from the business 1470 at or above a certain dollar amount which varies by the state in which the company resides. This information is not available from a single cloud service provider's database, it requires the ability of the invention issue derivative queries to cloud service provider A 1410 to get the address of each customer based on name and the purchases each customer has made from the database of cloud service provider B 1420. Taking this one step further using the invention's 1440 ability to update the data in remote databases 1413, 1423, the marketing department could change the promotional purchase discount of each company based upon their total purchases made in the past three months compared to the other customers in the same state. This task would, of course, involve not only the ability of the invention to perform inter-database joins on the databases of cloud service A 1413 and cloud service B 1423, but also the ability to then accept changes made to some of that data and to perform updates on the data of the foreign databases 1413, 1423. I should be remembered that the above examples are extremely oversimplified, easily manipulated examples used solely to explain certain capabilities of the invention, not as a reflection of the level of ability of the invention. Indeed, it is fully expected that actual manipulations performed by the invention will be significantly more complex than those discussed here and it is those complex manipulations for which the invention is designed.

Figure 15:
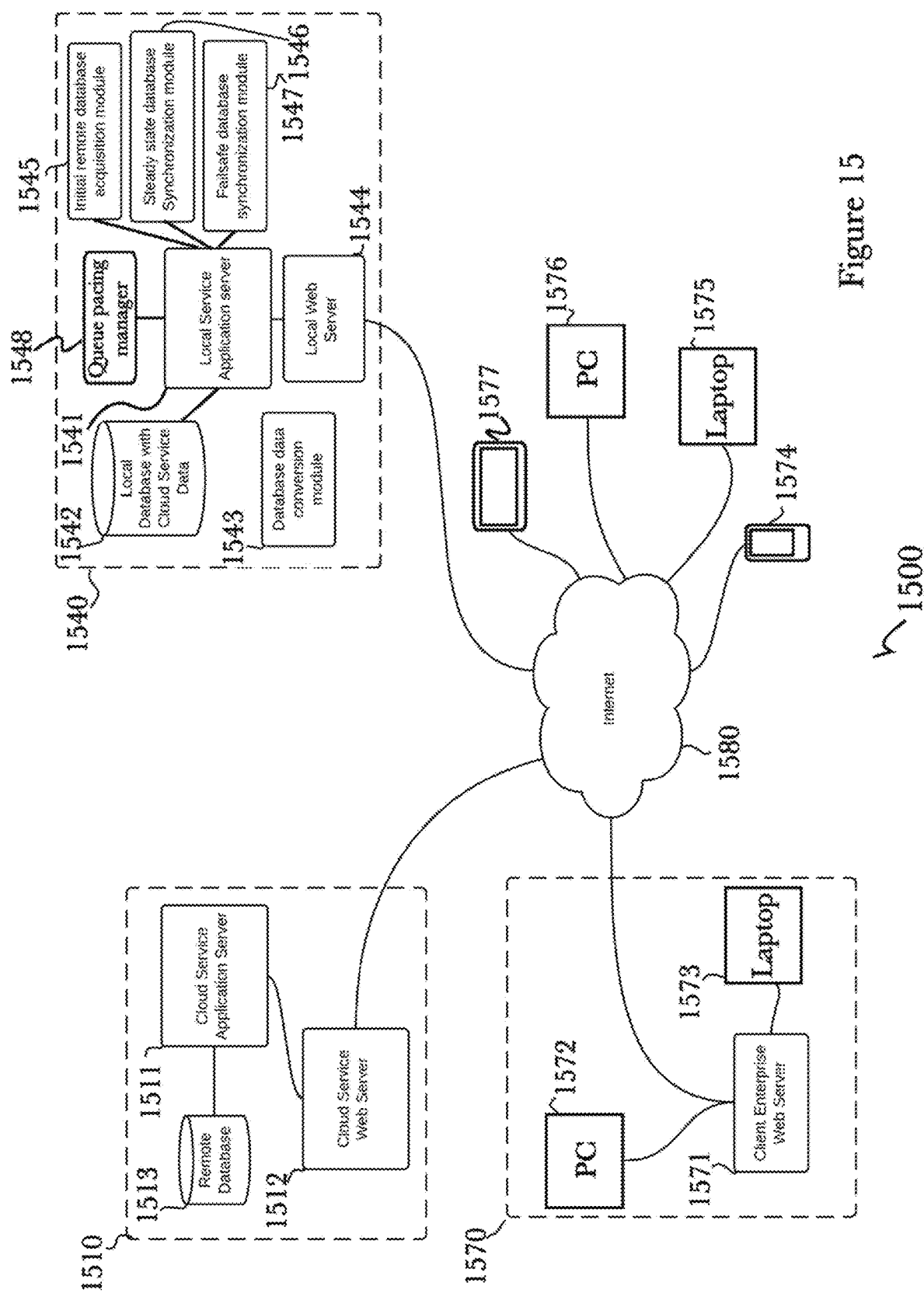
FIG. 15 is a diagram of an exemplary architecture for a system utilizing predictive and adaptive queue-flushing, where a local database is managing data from a database of another cloud service vendor as part of a local cloud service according to an embodiment of the invention.

FIG. 15 is a diagram of an exemplary architecture 1500 for a system utilizing predictive and adaptive queue-flushing, where the local database is managing data from the database of another cloud service vendor as part of the local cloud service according to an embodiment of the invention. According to the embodiment, a client enterprise 1570 is subscribed to a cloud service provider 1510, an example of which might be SALESFORCE™.com, which, among other things, provides data storage 1513 for all of enterprise's customer relationship information. As part of the cloud service 1510 subscription, the enterprise uses applications provided by the cloud service 1511 linked to the database of enterprise customer information 1513 within the cloud service provider's infrastructure 1510 and served over the internet 1580 by the cloud service provider's web servers 1512 as the enterprise's repository of potential and existing customer contact information, to track sales leads, to track products and related contracts sold by them to customers, and for customer problem management. As such, the information in this database 1510 is used to some extent by all employees within the enterprise 1570 through the enterprise's web interface 1571 whether the employees are at the enterprise's facilities employing devices that include traditional desktop computers 1572 or laptop computers 1573 or the employees are remote out in the field using devices such as smart phones 1574, laptop computers 1575, desktop computers 1576 or tablet devices 1577 connected using the various available gateways to the internet 1580 known to the art and the database is subject to continuous data changes which are vital to the function of the enterprise.

According to the embodiment, the concurrent use of the same data set by both cloud service providers 1510, 1540 while maintaining the integrity of the enterprise's 1570 master data source 1513 is accomplished by the incorporation of the enterprise's entire customer data set into database storage system 1542 of the second, local cloud service provider 1540. At initial set up of the local cloud provider's service, the provider's local application server 1541 uses an initial master database acquisition software module 1545 to request the bulk transfer of the enterprise's 1570 entire customer data set 1513 from the first cloud service provider 1510 over the internet 1580 through the local cloud service provider's web server interface 1544. This initial acquisition task might use a specialized bulk download call provided by the first cloud service's application programming interface 1511, if one is available. This task may also make use of REST-based, SOAP-based, or other, proprietary type requests provided by the first cloud service provider for smaller data downloads to transfer the entire remote data set 1513 either at initial set up of the novel cloud service database, or during the course of transactions where the data needed is present in the master database but not yet present in the novel cloud service's local database, as necessary and desired. Indeed, any method of electronic data transfer from the first cloud service provider to the local cloud service provider known to those familiar to the art, could be used as the invention does not depend on any specific protocol. As the designs of two independently developed data sources are invariably heterogeneous, often related to the specific use to which they are employed, it is expected that a database conversion module 1543 will be used to convert all data flowing between the local cloud service's database 1542 and the first cloud service's database 1513, both during the initial local database acquisition operation and during the subsequent synchronization operations required to insure data integrity of both databases 1542, 1513 in production use. Once in production, it would be expected that use of the local cloud service 1540 applications 1541 by the employees 1572, 1573, 1574, 1575, 1576, 1577 of the enterprise will introduce a plurality of changes to the local cloud provider's 1540 representation of the enterprise's data 1542 while continued use of the first cloud provider's 1510 applications 1511 by the enterprise's employees 1572, 1573, 1574, 1575, 1576, 1577 will lead to non-matching changes to the first cloud provider's representation of the enterprise's data 1513. A system of robust synchronization software has been developed to ensure that both the remote database 1513 and the local database 1542 have the same data in real time. The steady state database synchronization software module 1546 monitors for and uses messages issued by other cloud service providers 1510 that announce changes to their database 1513, to incorporate those changes into the local database 1542. If those messages include the data record that has changed, that is used by the database data conversion software module 1543 in the local database integration process. Otherwise, if the changed data is not included with the change message sent by the other cloud service provider 1510, the steady state database synchronization software module 1546, upon receiving the message, will request the changed data from the source 1510 and upon receipt, that data will be converted 1543 and incorporated into the local database 1542. While the steady state database synchronization software module 1546 is used by the invention to process change messages from other cloud service providers 1510 and incorporate the data into the local database is present, this should not be interpreted to mean that the invention is dependent on the other cloud service providing such messages, the invention can use other means to obtain changes made to the remote database 1513 and is not dependent on messages being sent. Conversely, changes made to the local database 1542 during production use are converted to the design of the remote cloud provider's data source 1513 and then incorporated into the other cloud service provider's 1510 database 1513 by application programming interface call. In rapidly changing stateless communications like those just outlined, information can be lost as messages are not delivered, due to packets being dropped 1580, server workload 1511, 1512, 1513, 1541, 1542, 1543, 1544 or complete outages of either communication hardware or server hardware. It is the function of the failsafe database synchronization software module 1547 to ensure that both databases are current. The failsafe database synchronization module 1547 possesses routines for both the timed confirmation of database synchronization and recovery of synchronization after functional communication failure of unforeseen period. The timed confirmation routine repetitively waits a predetermined interval of time, for example 30 minutes, and then polls both databases 1513, 1542 for all changes made during that period. Changes supplied by both databases are then compared and corresponding, incorporated changes are removed. Remaining changes to either the remote database 1513 or local database 1542 are then reconciled in case of multiple changes to the same records and the net changes incorporated as determined. In the case of communication loss between the two databases, the failsafe database synchronization software module 1547 records the start time of the outage and then the time that functional communications are restored. As with the recurring timed process, changes made to either the remote database 1513 or the local database 1542 are compared to remove any changes that have been resolved and the remaining changes reconciled at the record and field level to insure the incorporated data reflects the most current status as determined by the process.

An event queue pacing manager software module 1548 may be used to receive and track incoming messages before providing them to web server 1544 unaltered for further handling as described above. Messages may be counted and a timestamp recorded for the time each message is received, so that every incoming message leaves a timestamped record upon receipt. Queue pacing manager 1548 may then use message timestamps and counts to calculate an event velocity measurement representing the rate at which events are being received, for example within the time since the last data reconciliation operation. This event velocity measurement may be continually updated for a current time interval, and when data is reconciled between the local and remote databases, the event velocity measurement may be stored along with time interval information for future reference (for example, to store "event velocity X for time interval 00:00-00:05").

Additionally, event queue pacing manager 1548 may retrieve a plurality of stored event velocity measurements for a number of time intervals for use in predicting future event velocity measurements. By comparing the event velocity measurements for multiple time intervals, measurements may be internally modeled within software as an acceleration curve representing the change in velocity over time. By extrapolating along a curve (ideally one with sufficient statistical correlation between velocity measurements and time intervals, to improve the usefulness of extrapolation), future event velocity measurements may be predicted. Through the use of machine learning, additional considerations may be made when modeling an acceleration curve and predicting future measurements, such as considering specific time intervals rather than simply the length thereof (for example, "the velocity tends to be X around noon"), so that predictions may be honed to more accurately correlate to actual measurements.

Using event velocity and acceleration measurements, API calls may be reduced to avoid reaching a limit (for example, some providers may restrict API calls to 100,000 per day, or other limit configuration), and maximize API call efficiency without sacrificing real-time data reconciliation. It is generally a much more efficient use of computing resources to make a single API call for 100 data records (for example) than to make 100 single-record API calls, so by pacing requests based on velocity and acceleration measurements operation may be optimized to reduce hardware computing load as well as conserving a limited number of API calls remaining. By utilizing velocity and acceleration measurements to track and predict data changes in a remote database, the benefits of real-time data synchronization may be preserved by intelligently pacing the rate of API calls and data reconciliation operations to the rate of actual data changes. In this manner, steady state database synchronization software module 1546 may dynamically adjust its behavior to request changed data records based on event velocity and acceleration measurements from queue pacing manager 1548, to optimize API and hardware usage without sacrificing data synchronization. When a request is made and data is reconciled, steady state database synchronization software module 1546 may inform queue pacing manager 1548 so that the current time interval is stored with its event velocity measurement, and a new time interval new event velocity measurement calculation operation begins. In this manner, an event queue may be maintained for a time interval, during which time events are recorded and used in calculations but changed data is not retrieved (as the events themselves do not consume limited API calls or hardware resources). This queue is then flushed when data is reconciled, calculations and queue information (time interval and number of events received) are recorded for future use, and a new queue begins. Queue flushing may occur based on (for example) an event count (flushing after every X events), a timer (flushing every X minutes or seconds), or on a per-event basis, or any combination thereof.

Figure 16:
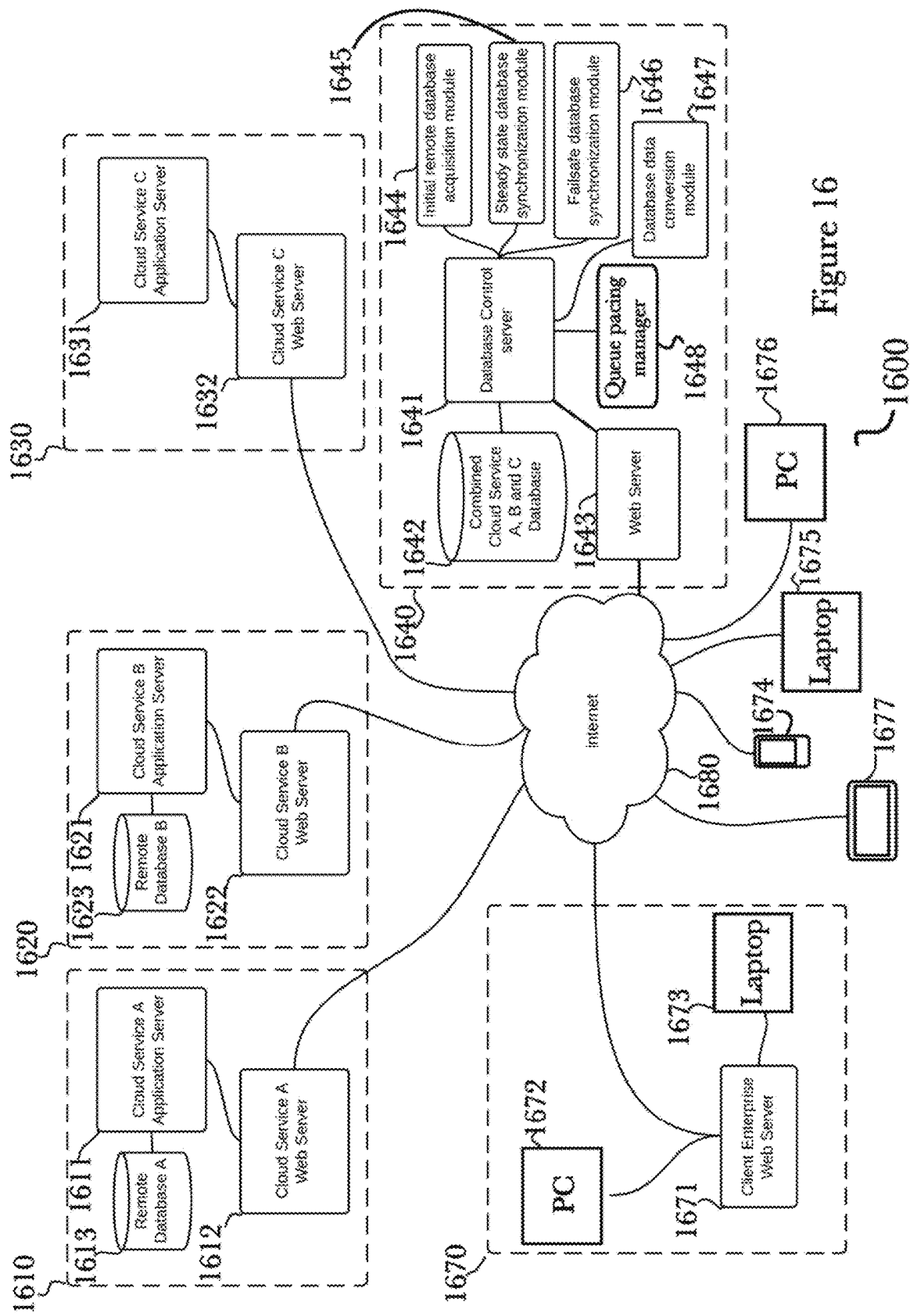
FIG. 16 is a diagram of an exemplary architecture for a system utilizing predictive and adaptive queue-flushing, where a local database is one of a plurality of cloud service based databases managed within a centralized database which might host the data employed by a plurality of additional cloud based services according to an embodiment of the invention.

FIG. 16 is a diagram of an exemplary architecture 1600 for a system utilizing predictive and adaptive queue-flushing, where the local database is one of a plurality of cloud service based databases managed within a centralized database which might host the data employed by a plurality of additional cloud based services according to an embodiment of the invention. According to the embodiment, a client enterprise 1670 is subscribed to a plurality of cloud service providers 1610, 1620 which, among other things, provide data storage for all of enterprise's package shipment tracking information for their heavy freight division 1613 and their rapid delivery division 1623. As part of the cloud service 1610 subscription, the enterprise's heavy freight division uses applications provided by cloud service A 1611 linked to the database of heavy freight division's container information 1613 within the cloud service provider's infrastructure 1610 and served over the internet 1680 by the cloud service provider's web servers 1612 as the heavy freight division's repository of shipper and recipient contact information, to track scheduled pickups, to track shipments and related shipper paperwork, and for shipment problem management. As such, the information in this database 1610 is used to some extent by all employees within the heavy freight division within the enterprise 1670 through the enterprise's web interface 1671 whether the those employees are at the enterprise's facilities employing devices that include traditional desktop computers 1672 or laptop computers 1673 or those employees are remote out in the field using devices such as smart phones 1674, laptop computers 1675, desktop computers 1676 or tablet devices 1677 connected using the various available gateways to the internet 1680 known to the art and the database is subject to continuous data changes which are vital to the function of the enterprise.

Likewise, as part of the cloud service subscription with cloud service provider B 1620, the enterprise's rapid delivery division uses applications provided by second cloud service 1621 linked to remote database B of rapid shipment division's shipping information 1623 within the second cloud service provider's infrastructure 1620 and served over the internet 1680 by the cloud service provider's web servers 1622 as the rapid shipment division's repository of shipper and recipient contact information, to track scheduled pickups, to track shipments and related shipper paperwork, and for shipment problem management. As such, the information in this database 1620 is used to some extent by all employees within the hazardous materials response division within the enterprise 1670 through the enterprise's web interface 1671 whether the those employees are at the enterprise's facilities employing devices that include traditional desktop computers 1672 or laptop computers 1673 or those employees are remote out in the field using devices such as smart phones 1674, laptop computers 1675, desktop computers 1676 or tablet devices 1677 connected using the various available gateways to the internet 1680 known to the art and the database is subject to continuous data changes which are vital to the function of the enterprise.

As the cloud based computer model has matured, it has become increasingly possible that an enterprise will depend on more than one cloud service provider which in turn rely on the same enterprise data to provide the optimal set of tools for their business needs. Using the shipping information example introduced above, one division of the enterprise may use one cloud service provider's package to track all existing shippers and recipients, shipments, problem tickets and to receive new pickup requests that come in through the enterprise's customer support line 1610 while a second division uses another cloud service provider for the same purposes 1620 for a plurality of reasons. It may then become highly advantageous for the entire enterprise to use the software package of a third cloud service provider 1630 for example, to capture and store pictorial data which the two original databases were ill equipped to handle and provide select public facing data on all packages as part of an emergency response initiative. Instead of having closed, local, data storage hardware, this third cloud service provider, C, uses their standalone database service to which they act as a client 1640 and which may or may not also serve the same data to other cloud service providers that the enterprise 1670 uses. One familiar with the art will immediately realize that the function of the three cloud software packages depends on the entire data set, which the third cloud provider draws fully from and the other cloud providers draw partially from being functionally identical and that individual portions derived from the provider A 1610 and provider B 1620 in cloud service C's standalone database system 1642 mirror the remote data sources 1610, 1620 exactly. In the embodiment, the concurrent use of the same data set by three cloud service providers 1610, 1620 while maintaining the integrity of the enterprise's 1670 remote data sources 1613, 1623 is accomplished by the incorporation of both portions of the enterprise's entire customer data set into standalone database storage system 1642 of the cloud service provider C 1640. At initial set up of the local cloud provider's service, the standalone data storage system's database controller 1641 uses an initial master database acquisition software module 1644 to request the bulk transfer of the enterprise's 1670 entire customer data set 1613, 1623 from cloud service provider A 1610 and cloud service provider B 1620 over the internet 1680 through the standalone data storage system's web server interface 1643. This initial acquisition task might use a specialized bulk download call provided by the cloud services' application programming interfaces 1611, 1621, if one is available. This task also make use of REST based, SOAP based, or streaming API-based (or any other appropriate protocol known in the art) requests provided by the cloud service providers A or B for smaller data downloads to transfer the entire remote data set 1613, 1623 if necessary. Indeed, any method of electronic data transfer from the first cloud service provider to the standalone data storage system known to those familiar to the art, could be used as the invention does not depend on any specific protocol. As the designs of three independently developed data sources are invariably heterogeneous, often related to the specific use to which they are employed, it is expected that a database conversion module 1647 will be used to convert all data flowing between the standalone data storage system's database 1642 and the other cloud services' databases 1613, 1623 both during the initial local database acquisition operation and during the subsequent synchronization operations required to insure data integrity of all three databases 1642, 1613, 1623 in production use. Once in production, it would be expected that use of the standalone data storage system 1640 by applications of cloud storage provider C 731 by the employees 1672, 1673, 1674, 1675, 1676, 1677 of the enterprise will introduce a plurality of changes to cloud service provider C's 1640 representation of the enterprise's data 1642 while continued use of the other two cloud providers' 1610, 1620 applications 1611, 1621 by the enterprise's employees 1672, 773, 1674, 1675, 1676, 1677 will lead to non-matching changes to the first two cloud providers' partial representations of the enterprise's data set 1613, 1623. A system of robust synchronization software has been developed as part of the invention to insure that both the remote databases 1613, 1623 and the standalone database 1642 have the same data in real time. The steady state database synchronization software module 1645 monitors for and uses messages issued by other cloud service providers 1610, 1620 that announce changes to their databases 1613, 1623 to incorporate those changes into the standalone database 1642. If those messages include the data record that has changed, that record is used by the database data conversion software module 1647 in the standalone data storage system's integration process. Otherwise, if the changed data is not included with the change message sent by the other cloud service providers 1610, 1620 the steady state database synchronization software module 1645, upon receiving the message, will request the changed data from the sources 1610, 1620 and upon receipt, that data will be converted 1647 and incorporated into the standalone database 1642. While the steady state database synchronization software module 1645 is used by the invention to process change messages from other cloud service providers 1610, 1620 and incorporate the data into the local database is present, this should not be interpreted to mean that the invention is dependent on the other cloud service providing such messages, the invention can use other means to obtain changes made to the remote databases 1613, 1623 and is not dependent on messages being sent. Conversely, changes made to the standalone database 1642 during production use are converted to the design of the remote cloud providers' data sources 1613, 1623 and then incorporated into the other cloud service provider's 1610, 1620 database 1613, 1623 by application programming interface call. In rapidly changing stateless communications like those just outlined, information can be lost as messages are not delivered, due to packets being dropped 1680, server workload 1611, 1612, 1613, 1621, 1622, 1623, 1641, 1642, 1643, or complete outages of either communication hardware or server hardware. It is the function of the failsafe database synchronization software module 1646 to insure that all databases are current. The failsafe database synchronization module 1646 possesses routines for both the timed confirmation of database synchronization and recovery of synchronization after functional communication failure of unforeseen period. The timed confirmation routine repetitively waits a predetermined interval of time, for example 30 minutes, and then polls all databases 1613, 1623, 1642 for all changes made during that period. Changes supplied by the databases are then compared and corresponding, incorporated changes are removed. Remaining changes to either remote databases 1613, 1623 or standalone database 1642 are then reconciled in case of multiple changes to the same records and the net changes incorporated as determined. In the case of communication loss between the any two or all three databases, the failsafe database synchronization software module 1646 records the start time of the outage and then the time that functional communications are restored. As with the recurring timed process, changes made to either remote database 1613, 1623 or the standalone system database 1642 are compared to remove any changes that have been resolved and the remaining changes reconciled at the record and field level to insure the incorporated data reflects the most current status as determined by the process.

An event queue pacing manager software module 1648 may be used to receive and track incoming messages before providing them to web server 1644 unaltered for further handling as described above. Messages may be counted and a timestamp recorded for the time each message is received, so that every incoming message leaves a timestamped record upon receipt. Queue pacing manager 1648 may then use message timestamps and counts to calculate an event velocity measurement representing the rate at which events are being received, for example within the time since the last data reconciliation operation. This event velocity measurement may be continually updated for a current time interval, and when data is reconciled between the local and remote databases, the event velocity measurement may be stored along with time interval information for future reference (for example, to store "event velocity X for time interval 00:00-00:05").

Additionally, event queue pacing manager 1648 may retrieve a plurality of stored event velocity measurements for a number of time intervals for use in predicting future event velocity measurements. By comparing the event velocity measurements for multiple time intervals, measurements may be internally modeled within software as an acceleration curve representing the change in velocity over time. By extrapolating along a curve (ideally one with sufficient statistical correlation between velocity measurements and time intervals, to improve the usefulness of extrapolation), future event velocity measurements may be predicted. Through the use of machine learning, additional considerations may be made when modeling an acceleration curve and predicting future measurements, such as considering specific time intervals rather than simply the length thereof (for example, "the velocity tends to be X around noon"), so that predictions may be honed to more accurately correlate to actual measurements.

Using event velocity and acceleration measurements, API calls may be reduced to avoid reaching a limit (for example, some providers may restrict API calls to 100,000 per day, or other limit configuration), and maximize API call efficiency without sacrificing real-time data reconciliation. It is generally a much more efficient use of computing resources to make a single API call for 100 data records (for example) than to make 100 single-record API calls, so by pacing requests based on velocity and acceleration measurements operation may be optimized to reduce hardware computing load as well as conserving a limited number of API calls remaining. By utilizing velocity and acceleration measurements to track and predict data changes in a remote database, the benefits of real-time data synchronization may be preserved by intelligently pacing the rate of API calls and data reconciliation operations to the rate of actual data changes. In this manner, steady state database synchronization software module 1646 may dynamically adjust its behavior to request changed data records based on event velocity and acceleration measurements from queue pacing manager 1648, to optimize API and hardware usage without sacrificing data synchronization. When a request is made and data is reconciled, steady state database synchronization software module 1646 may inform queue pacing manager 1648 so that the current time interval is stored with its event velocity measurement, and a new time interval new event velocity measurement calculation operation begins. In this manner, an event queue may be maintained for a time interval, during which time events are recorded and used in calculations but changed data is not retrieved (as the events themselves do not consume limited API calls or hardware resources). This queue is then flushed when data is reconciled, calculations and queue information (time interval and number of events received) are recorded for future use, and a new queue begins.

Description of Method Embodiments

Figure 2:
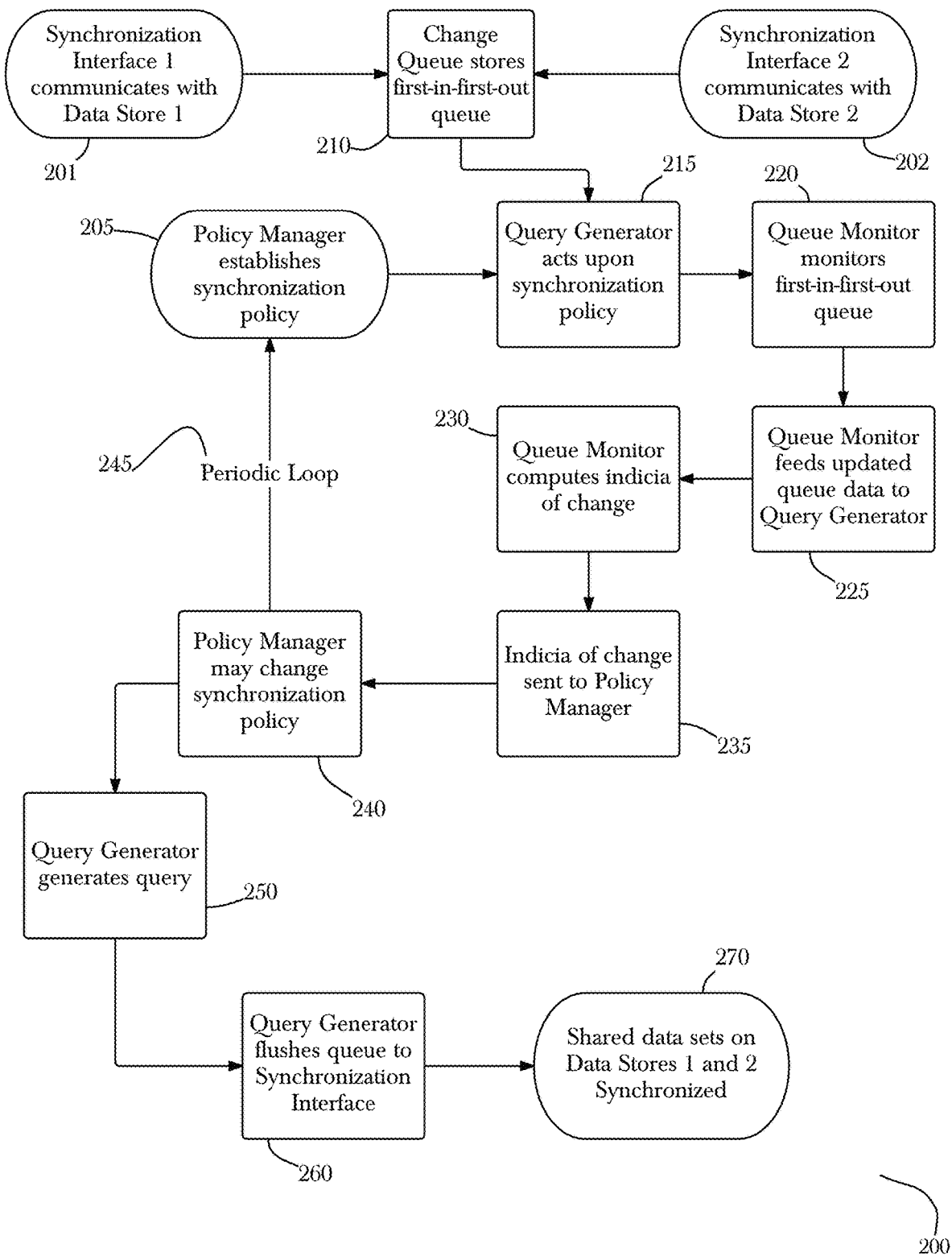
FIG. 2 is a flow diagram illustrating an exemplary method for predictive queue flushing for real-time data synchronization using a data synchronization system between a first data store and a second data store, according to a preferred embodiment of the invention.

FIG. 2 is a process flow diagram of a method 200 for predictive queue flushing for real-time data synchronization using a data synchronization system between a first data store and a second data store, the method comprising the following steps: a first data synchronization interface is configured to communicate via a network with the first data store 201; a second data synchronization interface is configured to communicate via a network with the second data store 202; a change queue stores change events with timestamps from the first and second data stores as a first-in-first-out queue 210; a policy manager establishes a synchronization policy for synchronizing a set of shared data between the first and second data store based at least in part on an indicia of change velocity, wherein the synchronization policy is drawn from a plurality of synchronization policies stored in a policy database 205; a query generator acts upon the synchronization policy established by the policy manager 215; a queue monitor monitors the first-in-first-out queue 220 and feeds updated change events with timestamps and a queue status to the query generator 225; the queue monitor computes at least an indicia of change velocity 230; the queue monitor may, from time to time, send at least an indicia of change velocity to the policy manager 235; the policy manager may periodically direct the query generator to change the existing synchronization policy to a different synchronization policy 240, which feeds back to step 205 wherein the policy manager may establish a different synchronization policy based on input from step 240 as well as being based on a plurality of synchronization policies stored in a policy database 120; the query generator generates a query by compiling a package of updated queue data 250; the query generator flushes the first-in-first-out queue in accordance with the established synchronization policy 260; and the query generator sends the query to either one or both of the synchronization interfaces, whichever is lacking the updated queue data in their respective data store, resulting in the shared data sets of the first and second data stores to become synchronized 270.

Figure 9:
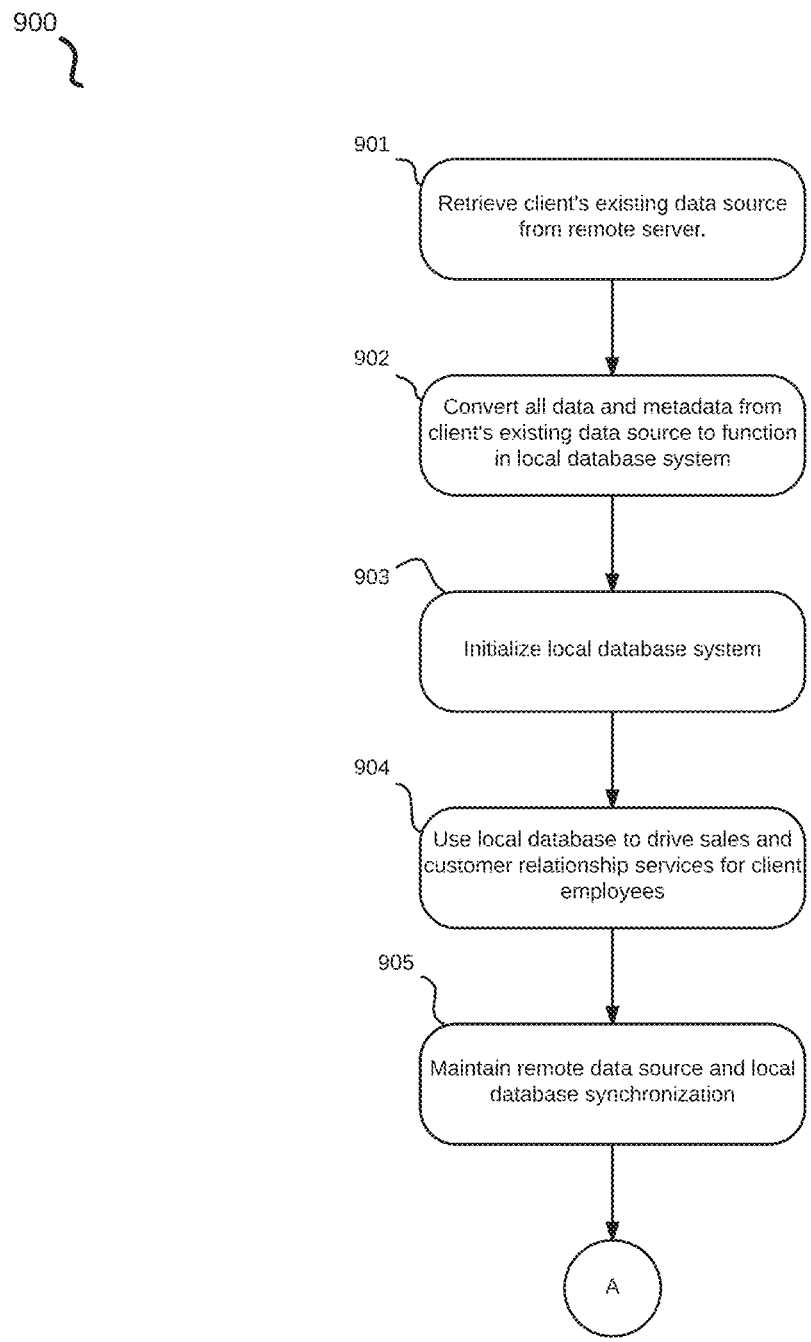
FIG. 9 is a process flow diagram of a method for download, conversion, and maintenance of a remote database by a local database using a system of the invention.

FIG. 9 is a process flow diagram of a method 900 for the download of the data set from a client enterprise's cloud service based master data source 510 to the second cloud service's local database 542. Ideally, this initial download 901, which has the potential to be very large in terms of data can be done using a bulk data transfer call provided by the remote master data source's application programming interface (API) found on their application server 511 as such a provision would result in the largest possible quantity of data transferred per request and the fastest possible transfer. In the absence of a specialized, bulk protocol, other API calls, based on common internet protocols such as REST or SOAP, possibly available for the download of smaller portions of the data source could be used to retrieve the entire data set over time. It should be clear that while this step of the local database initialization method relies on some means to download the data in the remote data source, the invention does not rely on any specific protocol or process and any protocol that allows the secure transfer of data over the internet could be used for this purpose, indeed data from the remote data source can be incorporated into the local as the data is used during production transactions if circumstances require such a method. Virtually all independent data repositories or sources differ in the design and manner in which the data is structured and represented due to data administrator's preference as well as the specific use to which the data is to be put. In order to incorporate the initial data from the remote data source 510 into the local database 903, one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. Once data conversion and initialization of the local database have completed 903, a final reconciliation of the data may be done by the failsafe database synchronization software module 547 (not specifically depicted in the diagram 900) prior to placing the applications of the local cloud service provider 540 into production 904. Once in production, it is crucial that the data in the local database and the remote data source remained synchronized in real-time 905. This is accomplished using methods for steady state synchronization 1000, 1100, and failsafe synchronization 1200, 1300 which together insure the integrity of the data in both locations 513, 542.

Figure 10:
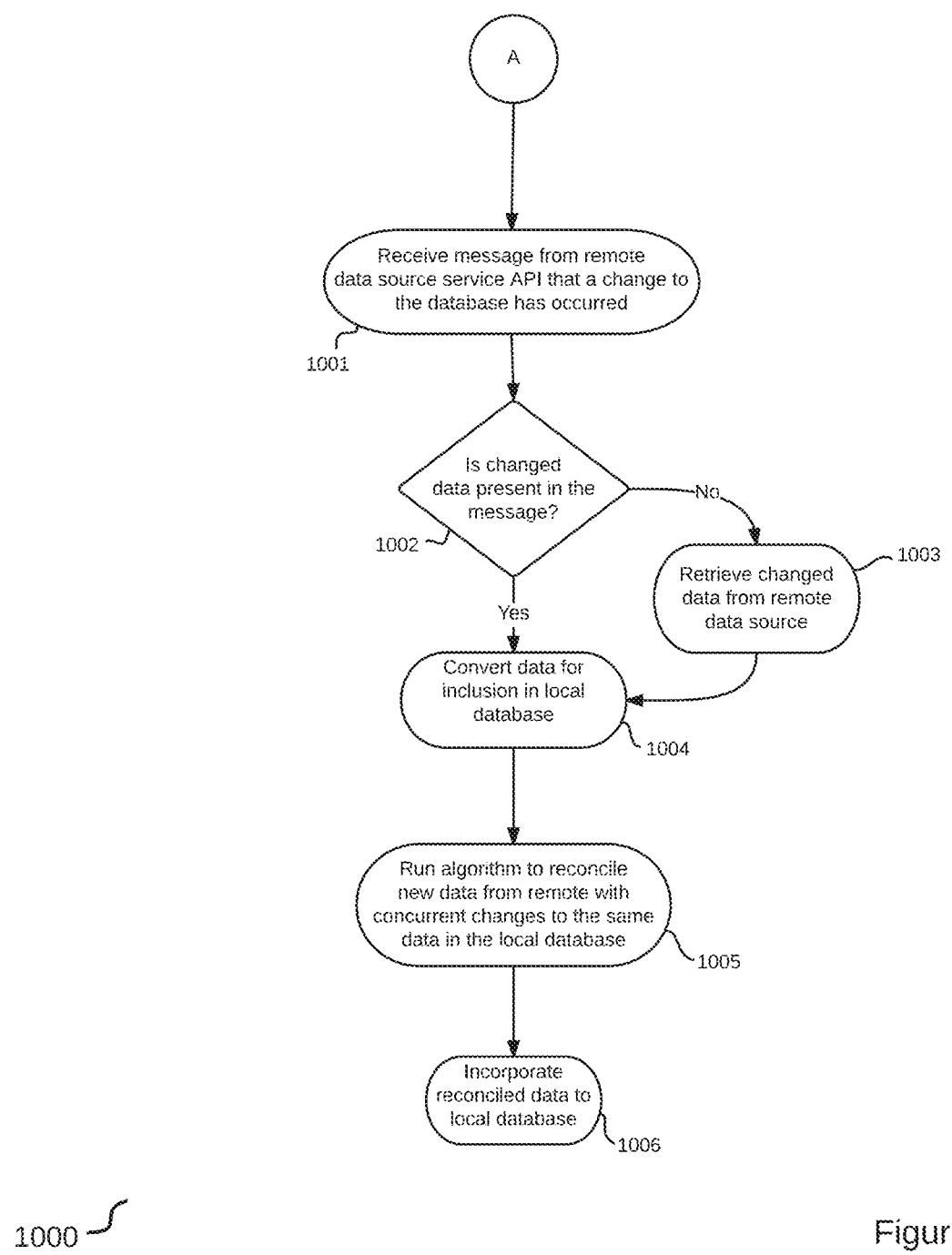
FIG. 10 is a process flow diagram of a method for steady state maintenance of synchronization between remote database and local database using a system of the invention.

FIG. 10 is a process flow diagram of a method 1000 for one embodiment of steady state data synchronization between the remote data source 510 and the local database 543. A change occurring to the data stored at the remote data source generates a message from the application server 511 at the remote data source to the local cloud service provider 541, 1001. This message may either contain a record with the data that has changed or may not contain that data 1002. If the data is not included in the message, the local application server 541 requests and retrieves that changed data 1003 from the remote data source 510. Those data from the remote data source may then undergo one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made concurrently within the target database, a type of race condition, algorithm's must be used to look at the precise time potentially conflicting modifications were incorporated, what data changed, what fields were affected, and the specific changes made to the fields that underwent update 1005 and possible alterations made to some of the data to reflect the resolved, net changes prior to committing that data record to the target database. This reconciliation process may result in the record being retransmitted back to the remote data source as described in 1100.

Figure 11:
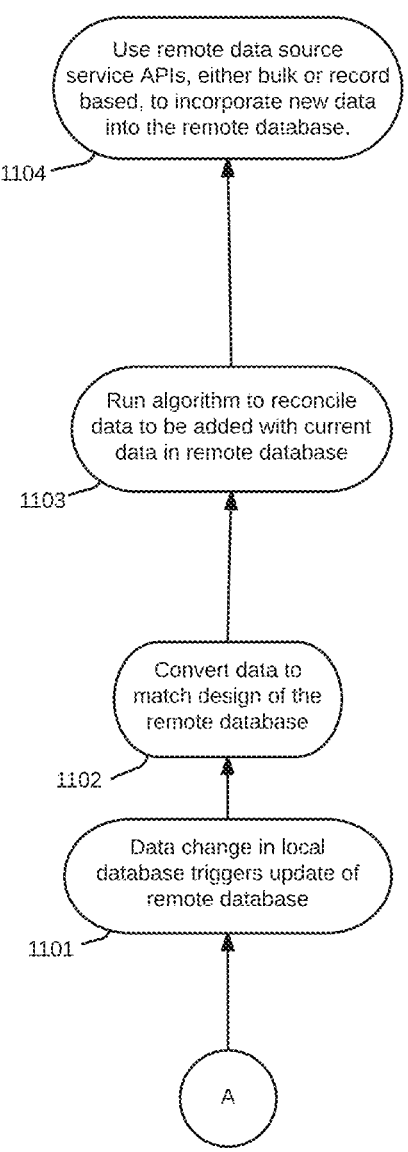
FIG. 11 is a process flow diagram of a method for steady state maintenance of synchronization between local database and remote database using a system of the invention.

FIG. 11 is a process flow diagram of a method 1100 for one embodiment of steady state data synchronization between the local database 543 and the remote data source 510. According to this embodiment, change occurring to the data stored in the local database 542, 1101 generates a message within the application server of the local cloud service provider 541 either due to a monitor algorithm resident in the application server or a trigger invoked in the database 543. This change message results in the changed record, or records as changes may be aggregated to minimize upload traffic and counts, being queued for transmittal to the remote data source 510. Those data from the local database may then undergo one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made concurrently within the target database, a type of race condition, algorithm's must be used to look at the precise time potentially conflicting modifications were incorporated, what data changed, what fields were affected, and the specific changes made to the fields that underwent update 1103 and possible alterations made to some of the data to reflect the resolved, net changes prior to committing that data record to the remote data source using API calls supplied by the remote data source application server 1104. The reconciliation process may result in the record being retransmitted back to the local database as described in 1000.

Figure 12:
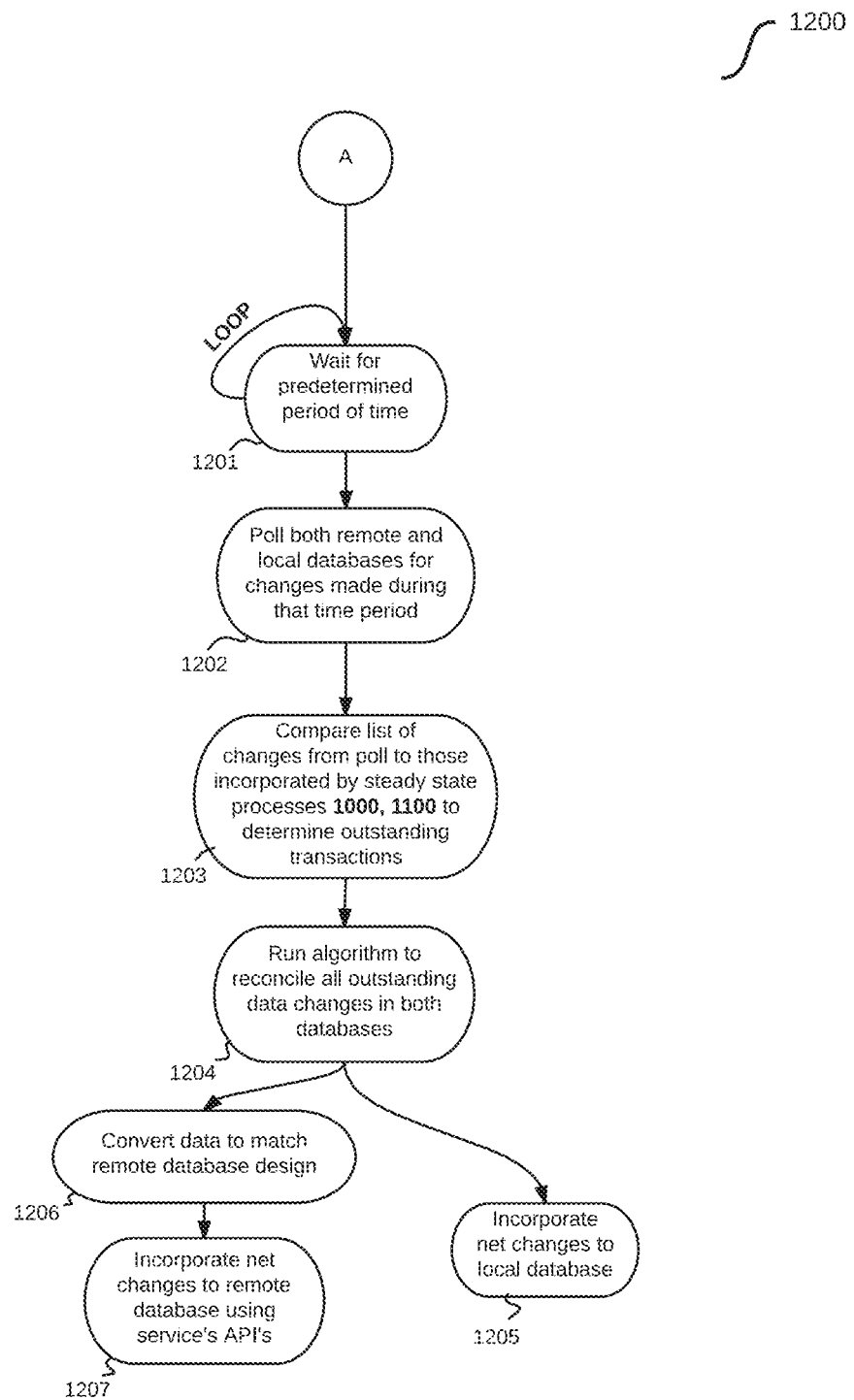
FIG. 12 is a process flow diagram of a method for timed failsafe maintenance of synchronization between remote database and local database using a system of the invention.

FIG. 12 is a process flow diagram of a method 1200 for one of the operations of the failsafe database synchronization software modules. To prevent the loss of synchronicity between the databases due to missed stateless messages and other undetected communication failures between the remote data source and the local database. This algorithm repetitively waits a predetermined period of time 1201 at which point it polls both the remote data source 510 and the local database 543 for all changes that have occurred during the prescribed time interval 1202. The reported changes from each the remote data source and the local database are compared 1203 and only changes that have not present in both are then acted upon. Outstanding changes are then subjected to one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made within one of the databases, algorithm's must be used to look at the precise time potentially conflicting modifications were incorporated, what data changed, what fields were affected, and the specific changes made to the fields that underwent update 1204. Net data changes are then incorporated into the local database 542, 1205, or converted to match the design parameters of the remote data source 1206 and incorporated into the remote data source 510 using one of the remote data source's API calls 1207.

Figure 13:
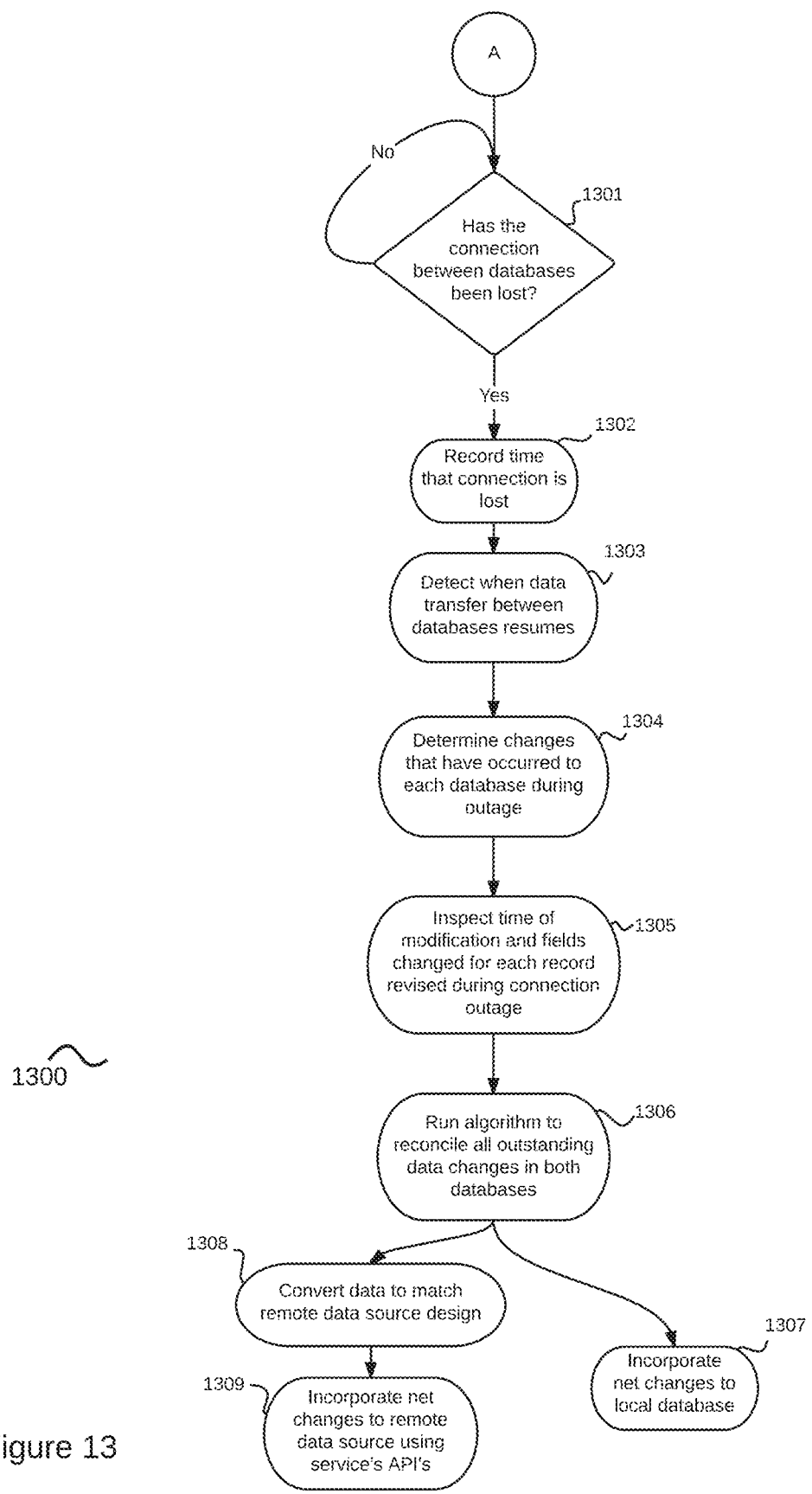
FIG. 13 is a process flow diagram of a method for failsafe maintenance of synchronization between remote database and local database after a communications outage using a system of the invention.

FIG. 13 is a process flow diagram of a method 1300 for recovery synchronization of remote data source 510 and local database 542 after a communications failure between the two of unforeseen amount of time. An algorithm part of failsafe database synchronization software module 547 monitors for a loss in functional communication between the remote data source and the local database 1301. Upon determination that communication has been lost, the time of loss is recorded by the algorithm 1302. When functional communication is detected as restored 1303, the failsafe algorithm polls both the remote data source 510 and the local database 543 for all changes that have occurred during the time interval of the outage 1304. The reported changes from each the remote data source and the local database 1305 are compared and only changes that have not present in both are then acted upon. Outstanding changes are then subjected to one or more modification steps drawn from a set comprising field name changes, table name changes, data type changes, metadata storage design changes, table assignment changes or any other modifications known to be useful by those familiar with the art may need to be employed by the database data conversion software module 543 of the local cloud service 540. To insure that the synchronization process does not result in the loss of changes to the same record made within one of the databases, algorithm's must be used to look at the precise time potentially conflicting modifications were incorporated, what data changed, what fields were affected, and the specific changes made to the fields that underwent update 1306. Net data changes are then incorporated into the local database 542, 1307, or converted to match the design parameters of the remote data source 1208 and incorporated into the remote data source 510 using one of the remote data source's API calls 1209.

Figure 17:
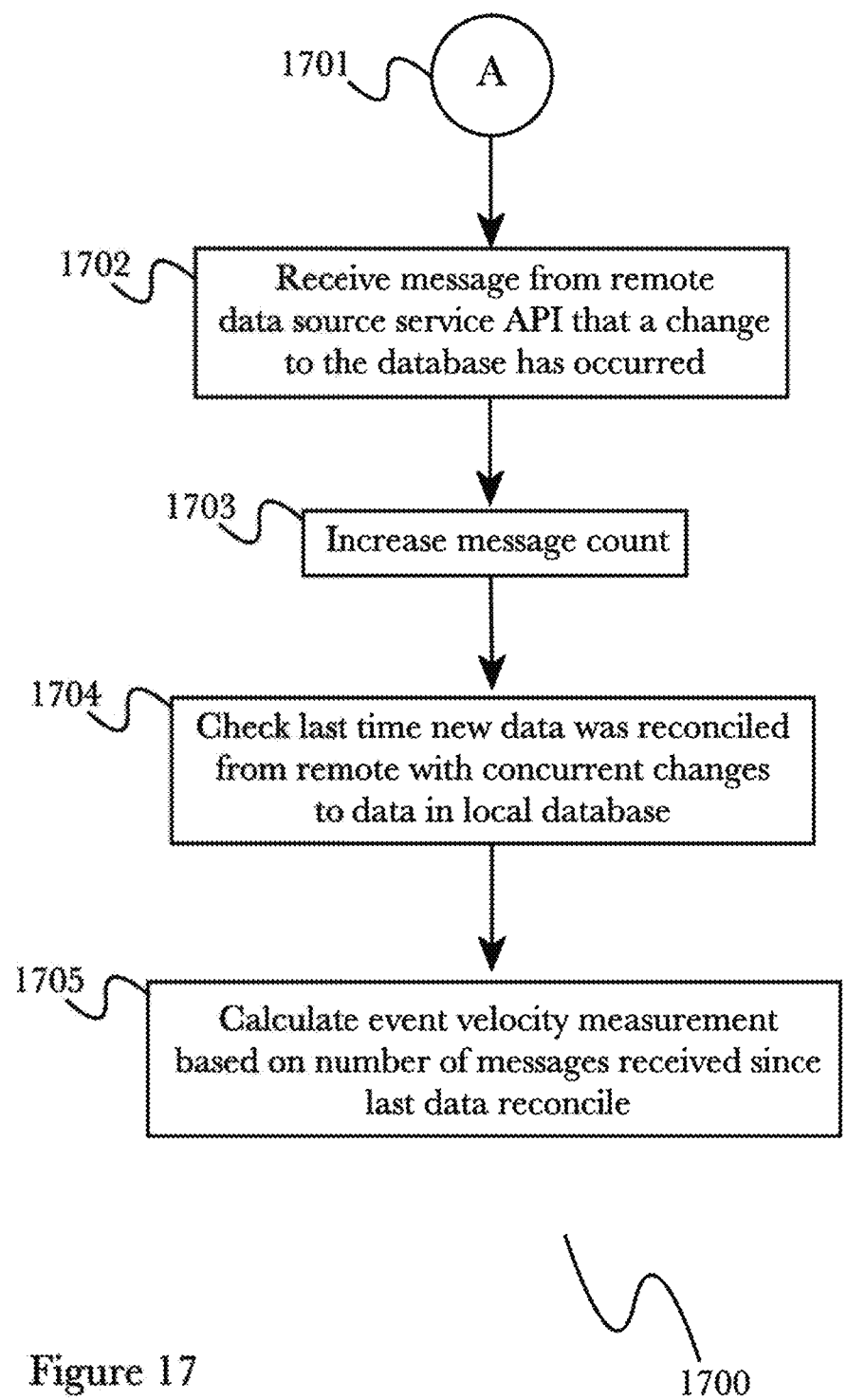
FIG. 17 is a process flow diagram of a method for measuring event velocity using a queue pacing manager, according to a preferred embodiment of the invention.

FIG. 17 is a process flow diagram of a method 1700 for measuring event velocity using a queue pacing manager, according to a preferred embodiment of the invention. While maintaining data synchronization between multiple databases 1701, an event queue manager 1548 may receive an incoming message from a remote data source notifying that a data change has occurred 1702. Generally, this notification message may not include any actual data and does not count against data query limits such as a number of remaining API calls. Event queue manager 1548 may then increase a count of messages received during the current time interval 1703 before passing the message through to web server 1544 for further handling, and may then check the last known time that data was synchronized 1704 by reconciling data record changes between databases as described above. Using the known synchronization time, current time interval length, and the current message count within the time interval, an event velocity measurement may be calculated to represent the rate at which events are being received during the current time interval 1705.

Figure 18:
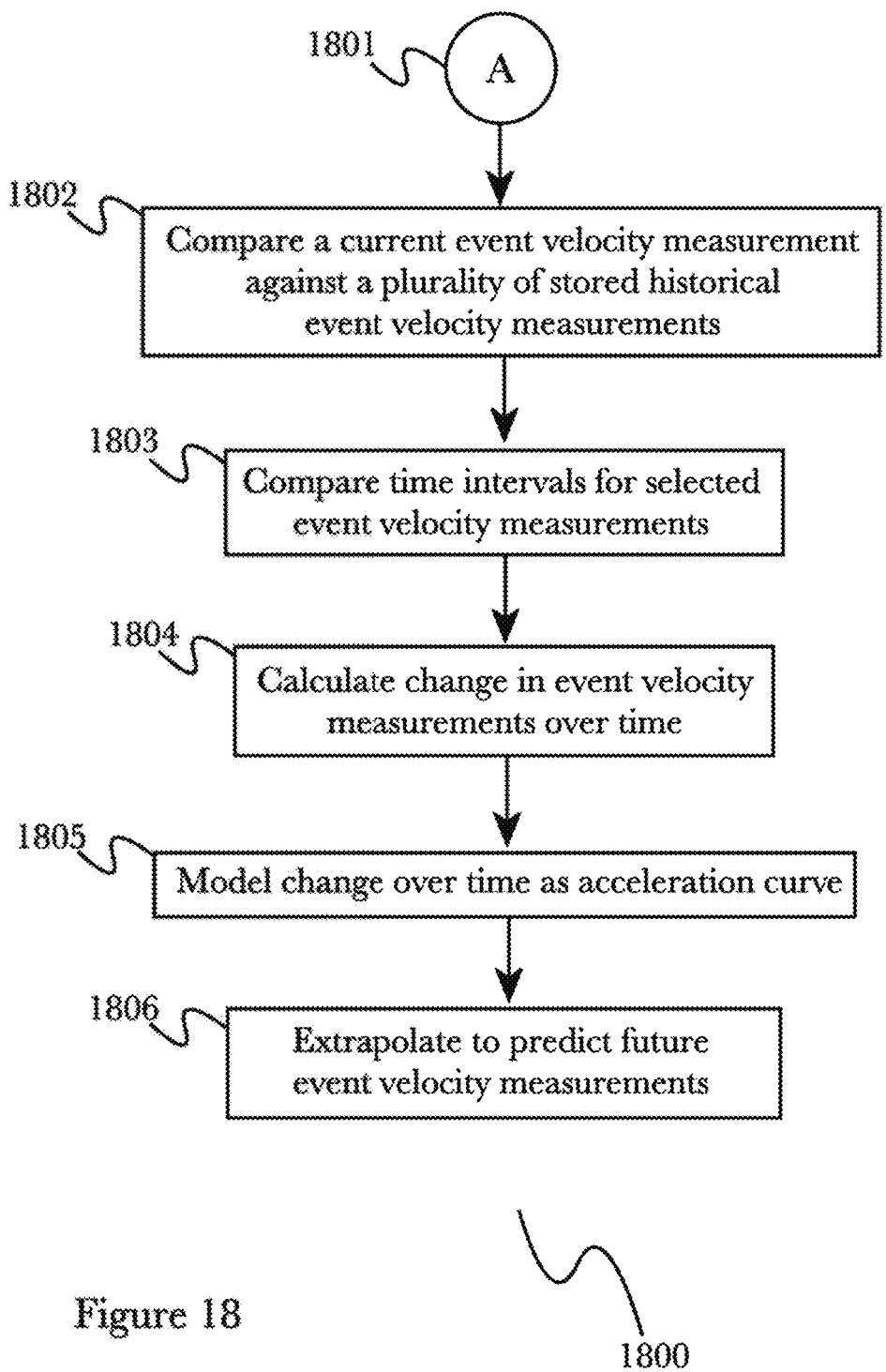
FIG. 18 is a process flow diagram of a method for predicting event acceleration using a queue pacing manager, according to a preferred embodiment of the invention.

FIG. 18 is a process flow diagram of a method 1800 for predicting event acceleration using a queue pacing manager, according to a preferred embodiment of the invention. While maintaining data synchronization between multiple databases 1801, an event queue manager 1548 may compare a current event velocity measurement for a current time interval against a plurality of stored measurements for historical time intervals 1802, for example recorded intervals at the same time during previous days, or recent recorded intervals for previous times during the current day, or other possible arrangements. The time intervals for these recorded measurements may then be compared 1803 to calculate the rate of change in event velocity measurements over time 1804, for example to calculate how the flow of event pacing changed over the course of a day or how event pacing changed from one day to another during a similar time period. These calculations may then be internally modeled as an acceleration curve 1805 for use in data extrapolation 1806, and extrapolated values may be used to predict future event velocity measurements to anticipate event flow and act accordingly. For example, database synchronization software module 1546 may determine when to perform data reconciliation operations and how to allocate remaining API calls for operations based on anticipated event flow rates.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 19:
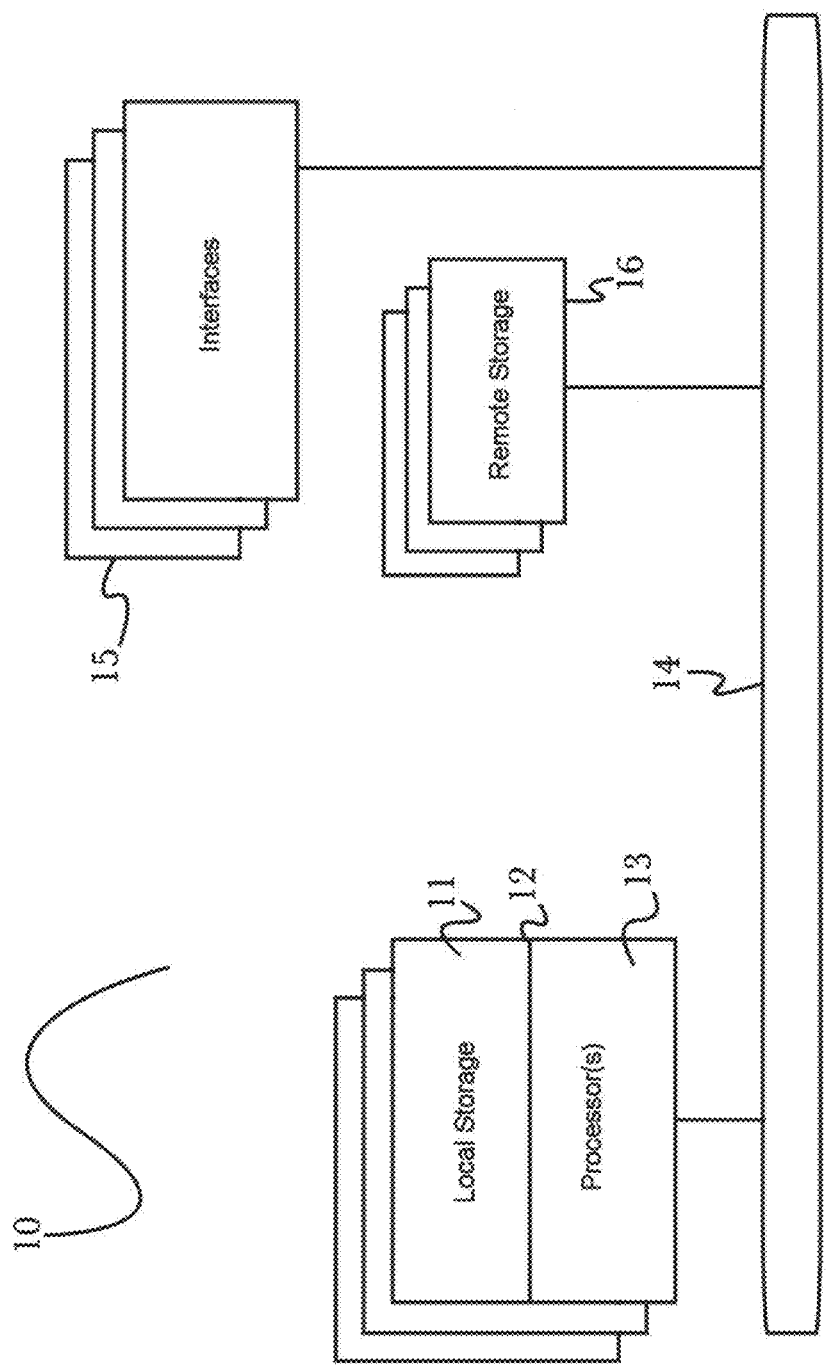
FIG. 19 is a block diagram illustrating an exemplary hardware architecture of a computing device used in various embodiments of the invention.

Referring now to FIG. 19, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP- DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 19 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 20:
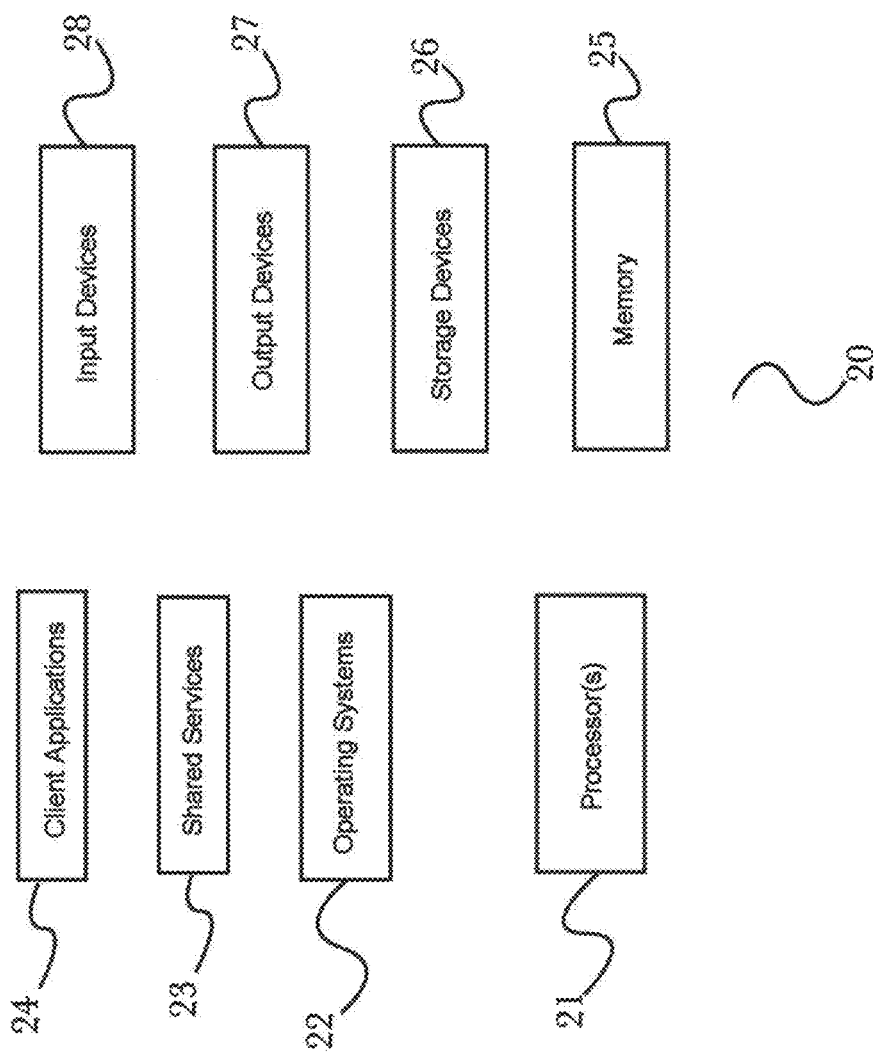
FIG. 20 is a block diagram illustrating an exemplary logical architecture for a client device, according to various embodiments of the invention.

In some embodiments, systems according to the present invention may be implemented on a standalone computing system. Referring now to FIG. 20, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 19). Examples of storage devices 26 include flash memory, magnetic hard drive, CD-ROM, and/or the like.

Figure 3:
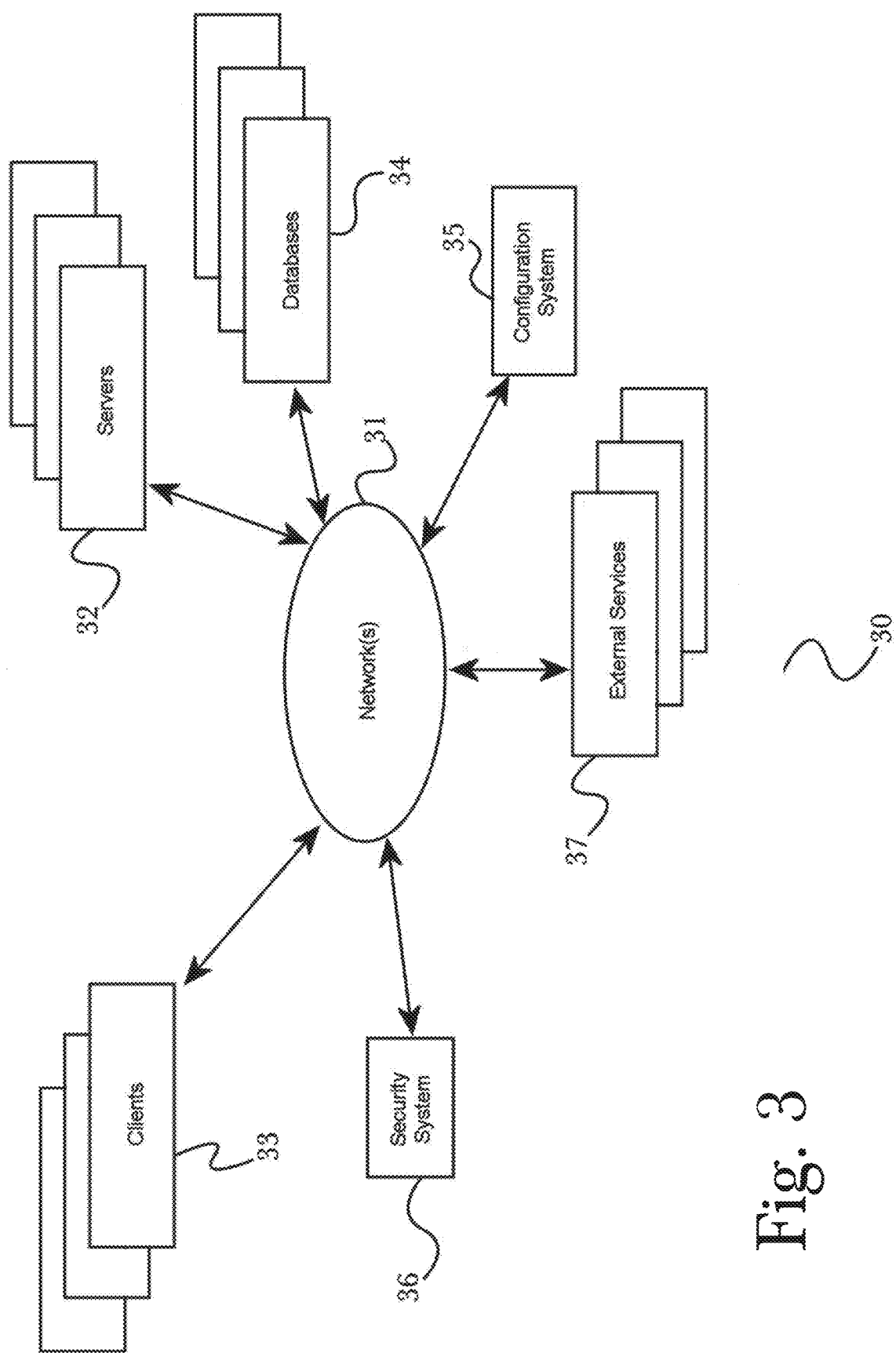
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 20. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 4:
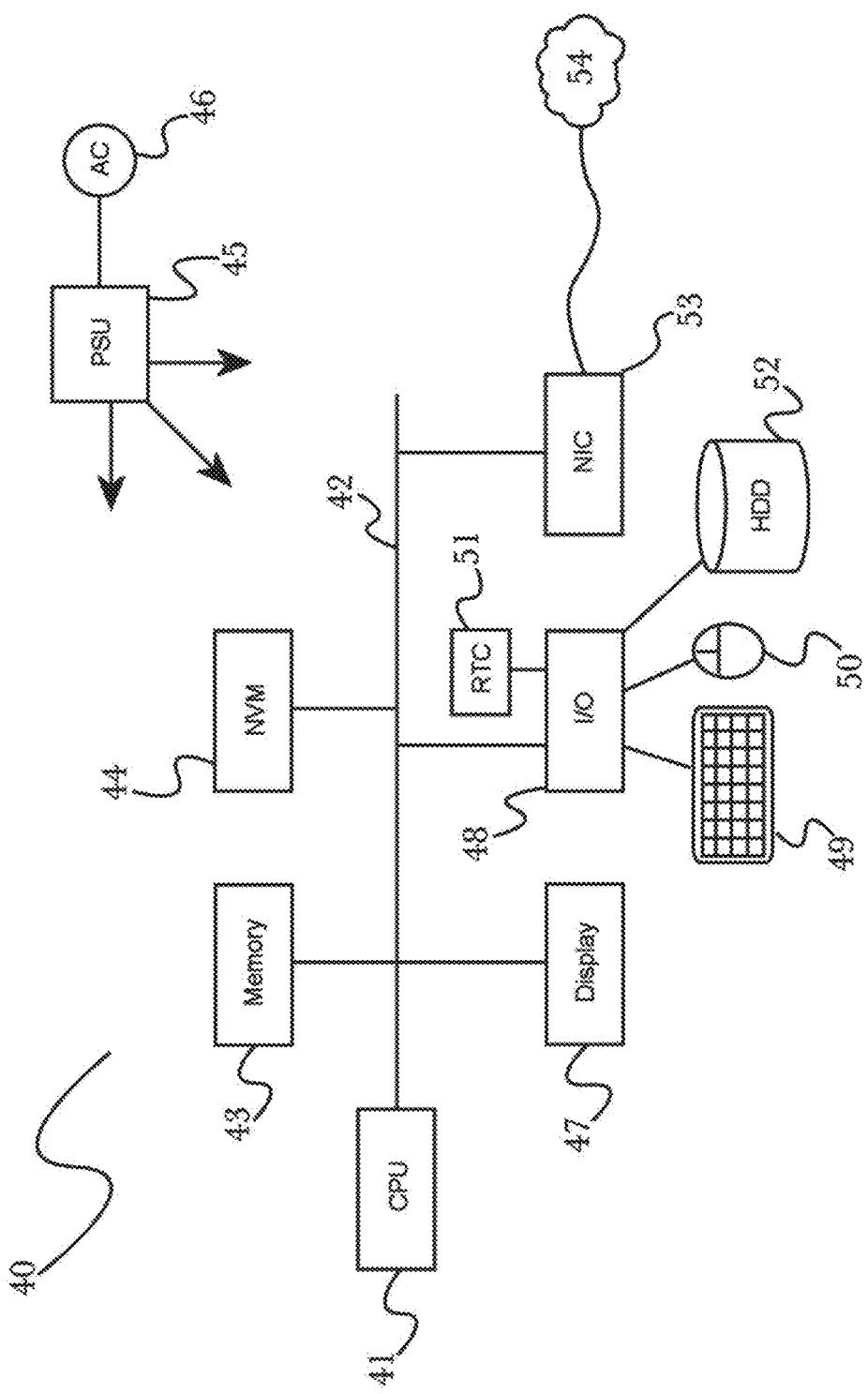
FIG. 4 is a block diagram illustrating an exemplary overview of a computer system as may be used in any of the various locations throughout the system

FIG. 4 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for near-real-time data synchronization between two data stores with API call limit management, comprising:
a data synchronization system comprising a memory, a processor, and a plurality of software components stored in the memory and operating on the processor, the plurality of software components comprising:
a first data synchronization interface communicating via a network with a first data store;
a second data synchronization interface communicating via a network with a second data store, wherein the second data store:
is a remote data store accessible via application programming interface (API) calls over the Internet; and
has a limit on both the number of API calls that can be made in a given time frame and the number of records that can be uploaded to, or downloaded from, the second data store in each API call;
a change queue configured to receive change events with timestamps from the first and second data stores, wherein each change event corresponds to a plurality of changes in records at either the first data store or the second data store;
a queue monitor configured to monitor the change queue to compute:
a change event velocity;
a change event acceleration;
a number of records currently ready to be synchronized; and
a predicted number of records that will be ready to be synchronized within a given future time frame based on the event velocity, the event acceleration, and the number of records currently ready to be synchronized;
a policy manager configured to establish a synchronization policy for synchronizing the records between the first and second data store, wherein the synchronization policy comprises:
a target synchronization time interval,
an API call limit representing the limit on the number of API calls that can be made in a given time frame;
a record limit representing the number of records that can be uploaded to, or downloaded from, the second data store in each API call; and
calculation of a rate of API calls and a number of records per API call that will synchronize records within given time frame within the given constraints, based on the computations of the queue monitor:
at an average synchronization time less than the target synchronization time interval; and
within the API call limit; and
a query generator configured to generate API calls to synchronize the first data store and second data store according to the synchronization policy.

2. The system of claim 1, wherein the synchronization is dynamically adjusted by the policy manager to achieve near-real-time synchronization of the shared data sets of the first and second data stores without exceeding either the API call limit or the record limit.

3. The system of claim 1, wherein change events from the first data store are received synchronously by the data synchronization system.

4. The system of claim 1, wherein change events from the first data store are received by the data synchronization system on request using periodic polling by the first data synchronization interface.

5. The system of claim 1, wherein the first data store and the second data store are cloud-based data services, at least one of which comprises an application programming interface (API) with an API call limit, a record limit, or both for third party access and wherein the synchronization policy is dynamically adjusted by the policy manager to achieve near-real-time synchronization of the shared data sets of the first and second data stores without exceeding either the API call limit or the record limit of either the first data store or the second data store.

6. A method for near-real-time data synchronization between two data stores with API call limit management, the method comprising the following steps:
receiving, using synchronization interfaces on a data synchronization system comprising a memory and a processor, change events with timestamps from a first data store and a second data store, wherein:
each change event corresponds to a plurality of changes in records at either the first data store or the second data store; and
the second data store:
is a remote data store accessible via application programming interface (API) calls over the Internet; and
has a limit on both the number of API calls that can be made in a given time frame and the number of records that can be uploaded to, or downloaded from, the second data store in each API call;
storing the received change events in a change queue operating on the data synchronization system, wherein each change event corresponds to a plurality of changes in records at either the first data store or the second data store;
monitoring the change queue, using a queue monitor operating on the data synchronization system, and computing:
a change event velocity;
a change event acceleration;
a number of records currently ready to be synchronized; and
a predicted number of records that will be ready to be synchronized within a given future time frame;
establishing a synchronization policy for synchronizing the records between the first and second data stores using a policy manager operating on the data synchronization system, wherein the synchronization policy comprises:
a target synchronization time interval,
an API call limit representing the limit on the number of API calls that can be made in a given time frame;
a record limit representing the number of records that can be uploaded to, or downloaded from, the second data store in each API call; and
calculation of a rate of API calls and a number of records per API call that will synchronize records within given time frame within the given constraints, based on the computations of the queue monitor:
at an average synchronization time less than the target synchronization time interval; and within the API call limit; and generating API calls to synchronize the first data store and second data store according to the synchronization policy using a query generator operating on the data synchronization system.

7. The method of claim 6, wherein the synchronization is dynamically adjusted by the policy manager to achieve near-real-time synchronization of the shared data sets of the first and second data stores without exceeding either the API call limit or the record limit.

8. The method of claim 6, wherein change events from the first data store are received synchronously by the data synchronization system.

9. The method of claim 6, wherein change events from the first data store are received by the data synchronization system on request using periodic polling by the first data synchronization interface.

10. The method of claim 6, wherein the first data store and the second data store are cloud-based data services, at least one of which comprises an application programming interface (API) with an API call limit, a record limit, or both for third party access and wherein the synchronization policy is dynamically adjusted by the policy manager to achieve near-real-time synchronization of the shared data sets of the first and second data stores without exceeding either the API call limit or the record limit of either the first data store or the second data store.

* * * * *